United States Patent
Al-Saggaf et al.

(10) Patent No.: US 10,895,635 B1
(45) Date of Patent: Jan. 19, 2021

(54) METHOD OF PROCESSING WAVEFORMS AT A MULTIPLE-INPUT-MULTIPLE-OUTPUT (MIMO) RADAR FOR AN UNKNOWN TARGET

(71) Applicant: King Abdulaziz University, Jeddah (SA)

(72) Inventors: Ubaid M. Al-Saggaf, Jeddah (SA); Muhammed Moinuddin, Jeddah (SA); Mohamed K. Alshoubaki, Jeddah (SA); Ahmad Kamal Hassan, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/994,313

(22) Filed: Aug. 14, 2020

(51) Int. Cl.
*G01S 13/34* (2006.01)
*G01S 7/35* (2006.01)

(52) U.S. Cl.
CPC ............ *G01S 13/346* (2013.01); *G01S 7/352* (2013.01); *G01S 2007/358* (2013.01)

(58) Field of Classification Search
CPC ... G01S 13/346; G01S 7/352; G01S 2007/358
See application file for complete search history.

(56) References Cited

U.S. PATENT DOCUMENTS

| | | | |
|---|---|---|---|
| 9,608,803 B2 | 3/2017 | Alahmadi et al. | |
| 2017/0016987 A1* | 1/2017 | Gierull | ............ G06T 7/11 |
| 2017/0248692 A1 | 8/2017 | Zivkovic | |

FOREIGN PATENT DOCUMENTS

| | | |
|---|---|---|
| CN | 108401255 A | 8/2018 |
| CN | 110082731 A | 8/2019 |
| JP | 2011-512742 A | 4/2011 |

OTHER PUBLICATIONS

Chen, "Signal Processing Algorithms for MIMO Radar", California Institute of Technology, Jun. 5, 2009, 155 pages.

(Continued)

*Primary Examiner* — Timothy A Brainard
(74) *Attorney, Agent, or Firm* — Oblon, McClelland, Maier & Neustadt, L.L.P.

(57) ABSTRACT

A method of processing waveforms associated with an unknown random target, wherein the waveforms are transmitted from and received at a multiple-input multiple-output (MIMO) radar, is described. A finite signal is transferred through a digital to analog (D/A) filter and a modulation section, such that a set of transmitting antenna elements may transmit a plurality of incident waveforms towards the unknown target. When the MIMO radar receives a plurality of reflected waveforms from the unknown target, a received signal is formulated by filtering and demodulating the reflected waveforms. The received signal is a function of the target, clutter, and white noise. The received signal is used to determine a signal-to-interference-plus-noise (SINK) ratio and also to derive a calculation module for the outage probability of the MIMO radar. The calculation module is solved to reduce the outage probability of the MIMO radar.

13 Claims, 15 Drawing Sheets

(56) References Cited

OTHER PUBLICATIONS

Chen, et al., "MIMO Radar Waveform Optimization With Prior Information of the Extended Target and Clutter", IEEE Transactions on Signal Processing, vol. 57, No. 9, Sep. 2009, 12 pages.

Tang, et al., "Transmit Waveform Optimization for Spatial-Frequency Diversity MIMO Radar in the Presence of Clutter", Hindawi Publishing Corporation, International Journal of Antennas and Propagation, vol. 2014, Article ID 510569, 9 pages, http://dx.doi.org/10.1155/2014/510569.

Mohammed, et al., "Outage probability analysis and adaptive combiner for multiuser multipolarized antenna systems", Turkish Journal of Electrical Engineering & Computer Sciences, vol. 27, Aug. 8, 2018, pp. 67-79.

Alrefaei, et al., "Genetic Algorithm with Multi-Parent Crossover for Cooperative Spectrum Sensing", 1st International Conference on Telematics and Future Generation Networks (TAFGEN), 2015, pp. 17-21.

Alrefaei, "Clustering Genetic Algorithm for Cognitive Radio Network", Journal of Engineering Research and Application, vol. 8, Issue 6 (Part-III) Jun. 2018, pp. 54-57.

Gojariya, et al., "Cyclostationarity-Based Spectrum Sensing Using Beamforming Algorithm in Cognitive Radio Networks", International Conferance and Workshop on Electronics & Telecommunication Engineering, 2016, pp. 63-69.

\* cited by examiner

METHOD OF PROCESSING WAVEFORMS AT A MULTIPLE-INPUT-MULTIPLE-OUTPUT (MIMO) RADAR FOR AN UNKNOWN TARGET

BACKGROUND

Field of the Invention

The present disclosure relates to a method of reducing an outage probability of a multiple-input-multiple-output (MIMO) radar. The present disclosure describes a process of analyzing a set of incident waveforms transmitted from the MIMO radar towards an unknown target, and a process of analyzing a set of reflected waveforms reflected from the unknown target to the MIMO radar in order to reduce the outage probability associated with the MIMO radar.

Description of the Related Art

In comparison to existing single antenna radar systems, a multiple-input multiple-output (MIMO) radar may provide better performance due to the operational freedom associated with MIMO radars. In particular, waveform optimization in MIMO radars may lead to improvements in target detection by minimizing a symbol error rate (SER) and by enhancing a probability of detection.

In contrast to conventional phased array radars with a single transmitting beam, the waveform diversity associated with MIMO radars may offer several advantages such as parameter identifiability, interference rejection capability, and flexible beam pattern design. See J. Li, P. Stoica, MIMO radar diversity means superiority, Wiley Online Library, 2009, incorporated herein by reference in its entirety.

Generally, an aggregated transmission signal may be designed using a direct approach or an indirect approach. In the direct approach, each sample of a transmitted waveform is designed. In contrast, the indirect approach is focused on the synthesis of transmitted signals and statistical parameters such as the covariance matrices. See J. Lipor, S. Ahmed, M. S. Alouini, Fourier-based transmit beam pattern design using MIMO radar, IEEE Transactions on Signal Processing 62 (9) 177 (2014) 2226-2235; J. Lipor, S. Ahmed, M. S. Alouini, Closed form Fourier-based transmit beamforming for MIMO radar, in: Acoustics, Speech and Signal Processing (ICASSP), 2014 IEEE International Conference on, IEEE, 2014, pp. 5272-5276; and S. Ahmed, J. S. Thompson, Y. R. Petillot, B. Mulgrew, Unconstrained synthesis of covariance matrix for MIMO radar transmit beam pattern, IEEE Transactions on Signal Processing 59 (8) (2011) 3837-3849, each incorporated herein by reference in their entirety.

Previous studies have partially improved performance metrics via waveform optimization in MIMO radar systems. For example, Quasi-orthogonal waveform designing methods have been proposed to minimize auto-correlation and cross-correlation of waveforms. See H. He, P. Stoica, J. Li, Designing unimodular sequence sets with good correlations including an application to MIMO radar, IEEE Transactions on Signal Processing 57 (11) (2009) 4391-4405; H. He, J. Li, P. Stoica, Waveform design for active sensing systems: a computational approach, Cambridge University Press, 2012; and J. Song, P. Babu, D. P. Palomar, Sequence set design with good correlation properties via majorization-minimization, IEEE Transactions on Signal Processing 64 (11) (2016) 2866-2879, each incorporated herein by reference in their entirety. Waveform synthesis in creating beam patterns and maximization of signal-to-interference-plus-noise ratio (SINR) has been addressed. See P. Stoica, J. Li, Y. Xie, On probing signal design for MIMO radar, IEEE Transactions on Signal Processing 55 (8) (2007) 4151-4161; D. R. Fuhrmann, G. San Antonio, Transmit beamforming for MIMO radar systems using signal cross-correlation, IEEE Transactions on Aerospace and Electronic Systems 44 (1); S. Ahmed, J. S. Thompson, Y. R. Petillot, B. Mulgrew, Finite alphabet constant-envelope waveform design for MIMO radar, IEEE Transactions on Signal Processing 59 (11) (2011) 5326-5337; A. Hassanien, S. A. Vorobyov, Transmit energy focusing for DOA estimation in MIMO radar with collocated antennas, IEEE Transactions on Signal Processing 59 (6) (2011) 2669-2682; S. Ahmed, M. S. Alouini, MIMO radar transmit beam pattern design without synthesizing the covariance matrix., IEEE Trans. Signal Processing 62 (9) (2014) 2278-2289; A. Aubry, A. De Maio, Y. Huang, MIMO radar beam pattern design via psl/isl optimization, IEEE Transactions on Signal Processing 64 (15) (2016) 3955-3967; C. Y. Chen, P. Vaidyanathan, MIMO radar waveform optimization with prior information of the extended target and clutter, IEEE Transactions on Signal Processing 57 (9) (2009) 3533-3544; S. M. Karbasi, A. Aubry, V. Carotenuto, M. M. Naghsh, M. H. Bastani, Knowledge-based design of space-time transmit code and receive filter for a multiple-input-multiple-output radar in signal-dependent interference, IET Radar, Sonar & Navigation 9 (8) (2015) 1124-1135; B. Tang, J. Li, Y. Zhang, J. Tang, Design of MIMO radar waveform co-variance matrix for clutter and jamming suppression based on space time adaptive processing, Signal Processing 121 (2016) 60-69; and B. Tang, J. Tang, Joint design of transmit waveforms and receive filters for MIMO radar space-time adaptive processing, IEEE Transactions on Signal Processing 64 (18) (2016) 4707-4722, each incorporated herein by reference in their entirety.

The assumption that a target is known is a drawback associated with existing MIMO radar research. See C. Y. Chen, P. Vaidyanathan, MIMO radar waveform optimization with prior information of the extended target and clutter, IEEE Transactions on Signal Processing 57 (9) (2009) 3533-3544, incorporated herein by reference in its entirety. Moreover, the randomization procedure associated with existing MIMO radar techniques may involve prohibitively high computational complexity. See Y. Li, N. Zheng, Y. Zhang, H. Li, H. Hu, MIMO radar waveform design with similarity constraint in the presence of interference, in: Information Technology and Mechatronics Engineering Conference (ITOEC), 2017 IEEE 229 3rd, IEEE, 2017, pp. 18-22; and C. Y. Chen, P. Vaidyanathan, MIMO radar waveform optimization with prior information of the extended target and clutter, IEEE Transactions on Signal Processing 57 (9) (2009) 3533-3544, each incorporated herein by reference in their entirety. Furthermore, another drawback associated with existing MIMO radar techniques is the process of utilizing SINR statistics where signal and interference power are evaluated separately by assuming both the target and the interferers are either moving slowly or still. See Y. Li, N. Zheng, Y. Zhang, H. Li, H. Hu, MIMO radar waveform design with similarity constraint in the presence of interference, in: Information Technology and Mechatronics Engineering Conference (ITOEC), 2017 IEEE 229 3rd, IEEE, 2017, pp. 18-22; L. Wu, P. Babu, D. P. Palomar, Transmit waveform/receive filter design for MIMO radar with multiple waveform constraints, IEEE Transactions on Signal Processing 66 (6) (2018) 1526-1540; and L. Wu, P. Babu, D. P. Palomar, A fast algorithm for joint design of transmit waveforms and receive filters, in: Signal Processing Advances in Wireless Communications (SPAWC), 2017 IEEE 18th International Workshop on, IEEE, 2017, pp. 1-5, each incorporated herein by reference in their entirety.

In view of the difficulties and drawbacks related to existing methods of processing waveforms at MIMO radars, the present disclosure describes a method of reducing the outage probability based on waveform improvement. The present disclosure further describes a process where the assumption of having a known target is eliminated and/or the assumption that the target is slow-moving or still is eliminated. The present disclosure describes a unified characterization methodology by utilizing an indefinite quadratic forms (IQF) approach.

SUMMARY OF THE INVENTION

The present disclosure describes a process of deriving theoretical derivations that may be used to reduce an outage probability of a multiple-input-multiple-output (MIMO) radar. In particular, the present disclosure describes a method that may be used in the detection of an unknown target, wherein a set of incident waveforms is transmitted from the MIMO radar towards the unknown target, and a set of reflected waveforms from the unknown target is received at the MIMO radar.

To transmit the set of incident waveforms, the MIMO radar utilizes a set of transmitting antenna elements. To receive the set of reflected waveforms, the MIMO radar utilizes a set of receiving antenna elements. The set of incident waveforms and the set of reflected waveforms are used to determine a signal-to-interference-plus-noise ratio (SINR) in a quadratic form, and the SINR is subsequently used to derive a calculation module for the outage probability of the MIMO radar. A receiver filter of the MIMO radar is communicably coupled to a processing unit which includes program instructions to determine the SINR and derive the outage probability. The calculation module is solved using an interior-point method or a sequential quadratic programming (SQP) method in order to reduce the outage probability of the MIMO radar.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
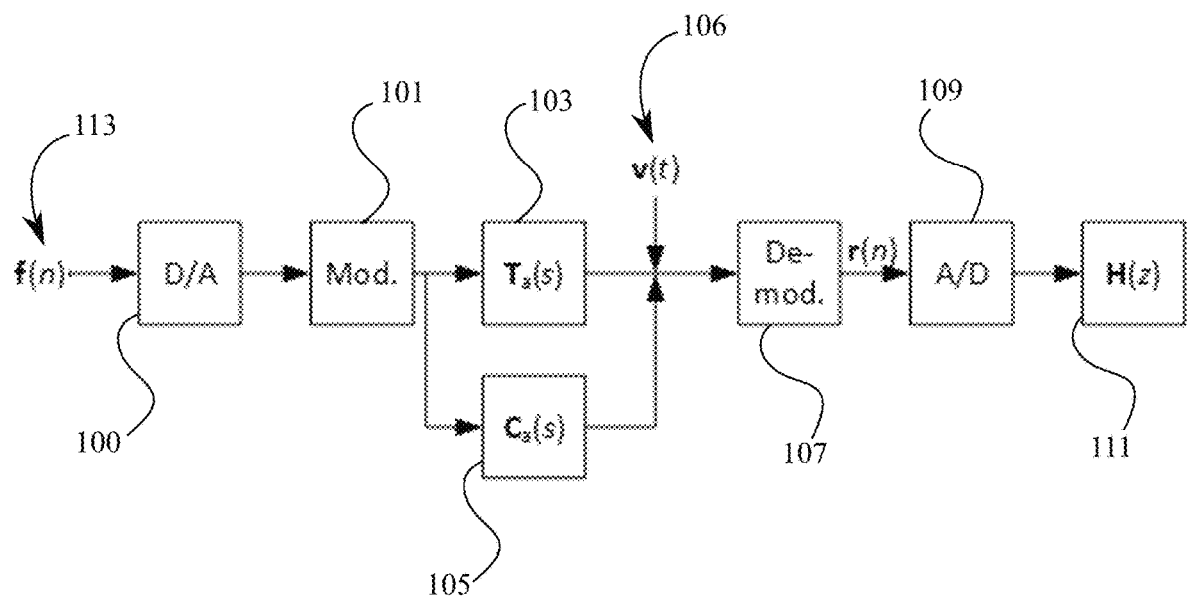
FIG. 1 is a block diagram illustrating a system used within a collocated multiple-input-multiple-output (MIMO) radar.

All illustrations of the drawings are for the purpose of describing selected embodiments of the present disclosure and are not intended to limit the scope of the present disclosure or accompanying claims.

The present disclosure describes a method of analyzing a multiple-input-multiple-output (MIMO) radar in the presence of an unknown target and clutter. The MIMO radar can either be a collocated MIMO radar or a distributed MIMO radar. In a collocated MIMO radar, each antenna element of the receiving antenna elements is positioned adjacent to each other such that a reflected signal from an observed target has a similar amplitude at each receiving antenna element. In particular, a target is detected equally at each antenna element distributed along a cross section of the MIMO radar. See J. Li, P. Stoica, MIMO radar with collocated antennas, IEEE Signal Processing Magazine 24 (5) (2007) 106-114, incorporated herein by reference in its entirety.

In a distributed MIMO radar, transmitting antennas and receiving antennas may be nodes of a small scale wireless network, and the transmitted waveforms may be uncorrelated or correlated to obtain a desired waveform pattern. Moreover, distributed MIMO radars observe a target at varying angles to achieve spatial diversity. Thus, the detection probability and the angle of estimation may improve in distributed MIMO radars. See W. Yi, T. Zhou, M. Xie, Y. Ai, R. S. Blum, Suboptimum low complexity joint multi-target detection and localization for noncoherent MIMO radar with widely separated antennas, arXiv preprint arXiv: 1701.01532; E. Fishler, A. Haimovich, R. S. Blum, L. J. Cimini, D. Chizhik, R. A. Valenzuela, Spatial diversity in radars models and detection performance, IEEE Transactions on Signal Processing 54 (3) (2006) 823-838; and C. Duofang, C. Baixiao, Q. Guodong, Angle estimation using esprit in MIMO radar, Electronics Letters 44 (12) (2008) 770-771, each incorporated herein by reference in their entirety. In a preferred embodiment, a collocated MIMO radar is used in the method described in the present disclosure.

The MIMO radar described in the present disclosure, comprises a plurality of transmitting antenna elements, a plurality of receiving antenna elements, a digital to analog (D/A) filter, a modulation section, a demodulation section, an analog to digital (A/D) filter, and a receiver filter. In order to begin an analyzing process for an unknown target, a finite signal, f(n), is initiated at a waveform generator, wherein the finite signal is intended to be transmitted towards the unknown target as a plurality of incident waveforms via the set of transmitting antenna elements. Preferably, the waveform generator is electronically connected to the MIMO radar to transfer the finite signal from the waveform generator to the MIMO radar.

The waveform generator may generate the finite signal on an intermediate frequency, wherein the intermediate frequency is a frequency to which a carrier wave is shifted as an intermediate step during transmission or reception. The waveform generator generally drives the amplitude and phase shifts of the waveforms that are transmitted. In a preferred embodiment, digital waveform generation (DWG) may be used when initiating the finite signal. In particular, DWG is a memory-based arbitrary waveform generator (AWG). In an AWG, arbitrary waveforms are generated within published limits of frequency range, accuracy, and output level.

Thus, when utilizing DWG, a desired waveform may be described by a mathematical function, and each discrete value of the function may be stored as a digital word in a memory. The memory may be counted using a system clock to provide values continuously at the output. At the output, the values may be converted to an analog voltage such that the individual values of time in quick succession provides the synthesized waveform. In a preferred embodiment, for radar applications, a frequency of the finite signal may be, but is not limited to, a frequency within the microwave frequency range. In particular, the frequency of the finite signal may be, but is not limited to, a frequency ranging from 300 Megahertz (MHz) to 300 Gigahertz (GHz), 500 MHz to 2.5 GHz, and 750 MHz to 2.0 GHz. The frequency of the finite signal may vary in other embodiments of the present disclosure.

As seen in FIG. 1, in an overall process of transmitting the finite signal 113 towards the unknown target, the finite signal 113 is transferred through the D/A filter 100 and the modulation section 101 such that the set of transmitting antenna elements receives a modulated analog signal.

In reference to FIG. 1, the D/A filter 100 converts a digital signal into an analog signal, wherein the finite signal 113 is the digital signal received by the D/A filter 100. The type of the D/A filter 100 of FIG. 1 may vary from one embodiment to another. In one embodiment, a pulse-width modulator where a stable current or voltage is switched into a low-pass analog filter with a duration determined by a digital input code may be used as the D/A filter 100 shown in FIG. 1.

In a different embodiment, an oversampling D/A filter may be used, wherein oversampling D/A filters use a pulse density conversion technique with oversampling. More specifically, oversampling is the process of sampling a signal at a sampling frequency which is significantly higher than the Nyquist rate, which is twice the bandwidth of a bandlimited function or a bandlimited channel.

In a different embodiment, a binary-weighted D/A filter, which includes individual electrical components for each bit of the D/A filter and is generally an operational amplifier, may be used as the D/A filter. Generally, binary-weighted D/A filters may be limited to 8-bit resolution or less.

In a different embodiment, a cyclic D/A filter may be used. In cyclic D/A filters, individual bits of a digital input are processed in each cycle for the entire digital input.

In a different embodiment, a thermometer-coded D/A filter may be used, wherein thermometer-coding is an entropy encoding process that represents a natural number, n, with n ones followed by a zero or with n−1 ones followed by a zero. The thermometer-coded D/A filter contains an equal resistor or current-source for each possible value of the D/A filter output. For example, an 8-bit thermometer-coded D/A filter may provide about 255 segments and a 16-bit thermometer-coded D/A filter may provide about 65,535 segments.

In reference to FIG. 1, the modulation section 101 is used to perform modulation on the analog signal received from the D/A filter 100. At the modulation section 101 shown in FIG. 1, modulation is applied continuously in response to the analog signal received from the D/A filter 100 which is also shown in FIG. 1. In analog signal modulation, an amplitude, a frequency, and/or a phase of the analog signal may be modulated. The process used within the modulation section 101, seen in FIG. 1, may vary from one embodiment to another.

In one embodiment, amplitude modulation (AM) may be used in the modulation section 101 of FIG. 1. In amplitude modulation, the amplitude (signal strength) of the carrier wave is varied in proportion to that of the message signal being transmitted. A modulation circuit used within the modulation section 101 of FIG. 1 may be categorized as a low-level generation circuit or a high-level generation circuit.

In low-level generation, modulated signals are generated using digital signal processing (DSP). In particular, DSP is the use of digital processing, such as by computers or more specialized digital signal processors, to perform a wide variety of signal processing operations. The digital signals processed in this manner are a sequence of numbers that represents a sample of continuous variables in a domain such as time, space, or frequency. In an embodiment where signal modulation is performed using DSP, a signal generated from DSP is initially transferred through the D/A filter 100 of FIG. 1 and into the modulation section 101. Subsequently, a resulting analog signal is shifted in frequency and linearly amplified to a desired frequency and power level.

High-level generation is when a high power section of the circuit, such as a final radio frequency (RF) amplifier, is modulated. Not requiring radio frequency amplification stages after AM is an advantage of high-level generation circuits. However, the need for high power amplifiers may be considered a drawback with high-level generation circuits. For example, in broadcast transmitters where significantly high power levels are used, class-D or class-E amplifiers may be employed for the audio output. A class-D amplifier or switching amplifier is an electronic amplifier in which the amplifying devices operate as electronic switches, and not as linear gain devices as in other amplifiers. Class-D amplifiers operate by rapidly switching back and forth between the supply rails, being fed by a modulator using pulse width, pulse density, or related techniques to encode the audio input into a pulse train. Furthermore, class-E amplifiers are highly efficient switching power amplifiers used at radio frequencies. Class-E amplifiers use a single-pole switching element and a tune reactive network between the switch and the load. Circuits using class-E amplifiers obtain high efficiency by operating the switching element at points of zero current (on to off switching) or zero voltage (off to on switching) such that the power lost in the switch is reduced even when the switching time of the devices is long when compared to the frequency of operation.

AM techniques which can be, but is not limited to, double-sideband suppressed-carrier transmission (DSB-SC), double-sideband reduced carrier transmission (DSB-RC), single-sideband modulation (SSB), vestigial sideband modulation (VSB), and Quadrature amplitude modulation (QAM) may be utilized in the modulation section 101, seen in FIG. 1.

In general, DSB-SC is an AM wave without the carrier such that power waste is reduced. DSB-RC transmission is a technique where the frequencies produced in AM modulation are symmetrically spread above and below the carrier, and the carrier level is reduced for transmission at a fixed level. In SSB transmissions, energy from an amplifier is used to provide longer-range transmission without an increase in power output. Moreover, SSB occupies approximately half of a spectrum compared to a full carrier AM signal. VSB is a type of AM technique that encodes data by varying the amplitude of a single carrier frequency. Portions of one of the redundant sidebands are removed to form a vestigial sideband signal. QAM is a signal in which two carriers shifted in phase by 90 degrees (i.e. sine and cosine) are modulated and combined.

In a different embodiment, frequency modulation (FM) may be used in the modulation section 101 of FIG. 1. In FM, the frequency of the carrier signal varies in accordance with the message signal, and other parameters like amplitude and phase remain constant.

In a different embodiment, phase modulation may be used in the modulation section 101 of FIG. 1. In phase modulation, the phase of the carrier signal varies in accordance with the message signal. Changing the phase of a signal affects the frequency. Thus, phase modulation may also be categorized under the frequency modulation.

The set of transmitting antenna elements transmits a plurality of incident waveforms towards the unknown target. More specifically, in reference to FIG. 1, the plurality of incident waveforms is associated with the finite signal 113 which is initiated at the waveform generator, converted to an analog signal at the D/A filter 100, and modulated at the modulation section 101. In a preferred embodiment, when $N_T$ antenna elements are used in the set of transmitting antenna elements of the MIMO radar, the plurality of incident waveforms may have a dimension of $N_T \times 1$.

Figure 2:
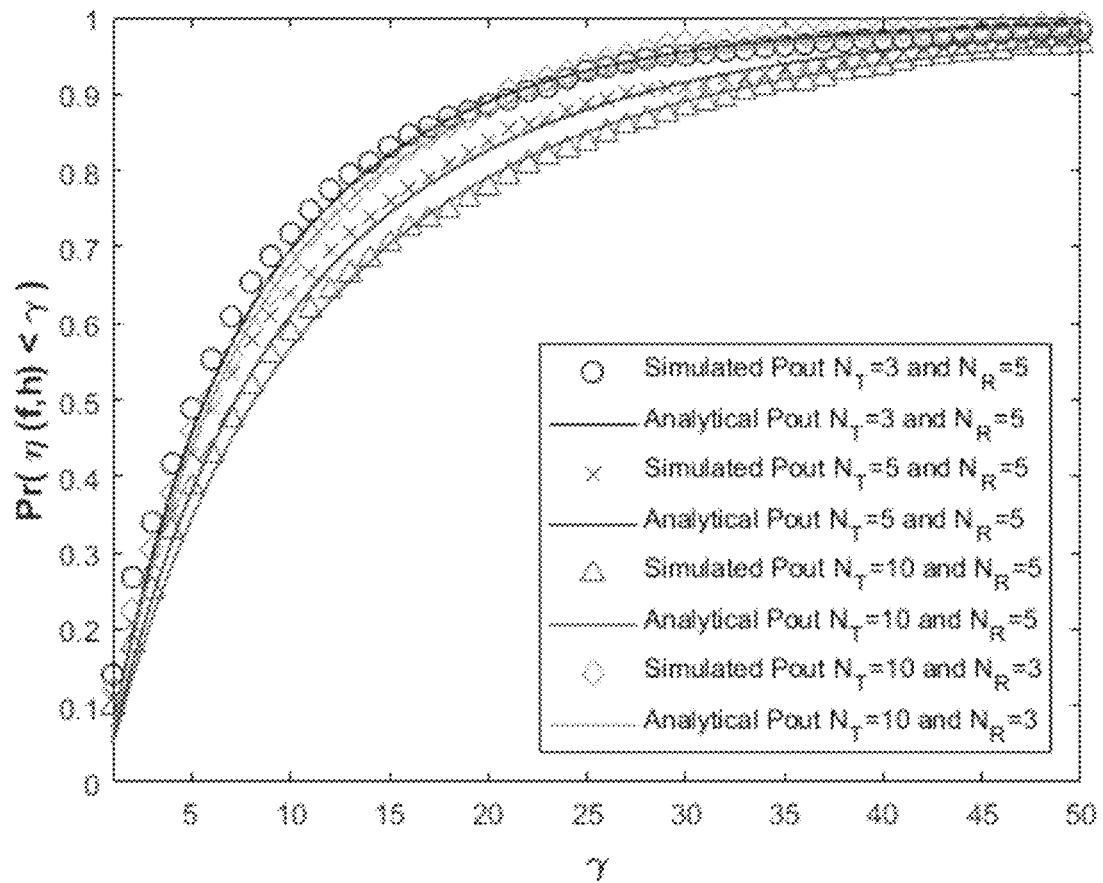
FIG. 2 is a graph comparing an outage probability against a predefined threshold value ($\gamma$) for a varying number of transmit antenna elements and receiving antenna elements of the MIMO radar, wherein simulated outage probability values and analytical outage probability values are represented for the varying number of transmit antenna elements and receiving antenna elements.

When the plurality of incident waveforms reaches the unknown target, referring to FIG. 1, the plurality of incident waveforms is transformed by a transfer function of the unknown target 103, represented by $T_a(s)$ in FIG. 1, and a transfer function of a volume of surrounding clutter 105, represented by $C_a(s)$ in FIG. 1. The plurality of incident waveforms transformed by $T_a(s)$ and $C_a(s)$ is received at the set of receiving antenna elements as a plurality of reflected waveforms. In a preferred embodiment, when $N_R$ antenna elements are used in the set of receiving antenna elements, the plurality of reflected waveforms may have a dimension of $N_R \times 1$. As seen in FIG. 2, the number of antenna elements used in the set of transmitting antenna elements and the set of receiving antenna elements impacts an outage probability of the MIMO radar. In particular, an increase in the number of antenna elements in both the set of transmitting antenna elements and the set of receiving antenna elements, resulted in a decrease in the overall outage probability of the MIMO radar.

Upon receiving the plurality of reflected waveforms at the plurality of receiving antenna elements, as seen in FIG. 1, the plurality of reflected waveforms is transferred through the demodulation section 107 and the A/D filter 109 to obtain a received signal.

In reference to FIG. 1, the demodulation section 107 is used to perform demodulation on the plurality of reflected waveforms corresponding to the received signal. The demodulation technique used within the demodulation section 107 of FIG. 1 can vary from one embodiment to another. For example, if AM was used at the modulation section 101 of FIG. 1, a synchronous detector may be used within the demodulation section 107 of FIG. 1. A synchronous detector is a device that recovers information from a modulated signal by mixing the modulated signal with a replica of a carrier signal that is not modulated through techniques such as the phase-locked loop technique. In particular, if the phase-locked loop technique is used, an output signal is generated where a phase of the output signal is related to a phase of an input signal.

In a different embodiment, if AM was used at the modulation section 101 of FIG. 1, an envelope detector may be used within the demodulation section 107 shown in FIG. 1. An envelope detector is an electronic circuit that takes a high-frequency amplitude modulated signal as input and provides an output which is the envelope of the original signal. The envelope detector can be, but is not limited to, a rectifier or other comparable non-linear component, which enhances one half of a received signal over the other half of the received signal, and a low-pass filter. The rectifier can be, but is not limited to, a single diode.

In a different embodiment, if AM was used at the modulation section 101 of FIG. 1, a product detector may be used within the demodulation section 107 shown in FIG. 1. The product detector multiplies the incoming signal by the signal of a local oscillator with the same frequency and phase as the carrier of the incoming signal. The simplest form of product detector mixes a radio frequency (RF) or an intermediate frequency (IF) signal with a locally derived carrier to produce a frequency copy of the original signal and a mixer product at twice the original RF or IF frequency. The high-frequency component can then be filtered out, leaving the original frequency signal.

In a different embodiment, if FM was used at the modulation section 101 of FIG. 1, a FM demodulator may be used within the demodulation section 107 shown in FIG. 1. In one embodiment, a slope detection technique may be used in the demodulation section 107 of FIG. 1. The slope detection technique relies on the selectivity of the set of receiving antenna elements to provide the preferred demodulation.

In a different embodiment, a ratio detector may be used within the demodulation section 107 of FIG. 1. The ratio detector requires the use of a transformer with a third winding to produce an additional signal that is phase shifted for demodulation purposes.

In a different embodiment, a Foster-Seeley demodulator may be used in the demodulation section 107 of FIG. 1. In general, the Foster-Seeley demodulator uses a tuned radio frequency transformer to convert frequency changes into amplitude changes. A circuit used in the Foster-Seeley demodulator may include a transformer tuned to a carrier frequency and connected to two rectifier diodes resembling a full-wave bridge rectifier. If an input equals the carrier frequency, two halves of the transformer produce a rectified voltage with an output of zero. As the frequency of the input changes, an overall voltage balance between the two halves of the transformer changes accordingly such that the voltage change is proportional to the frequency deviation of the carrier.

In a different embodiment, a phase locked loop (PLL) demodulator may be used in the demodulation section 107 of FIG. 1. If PLL is locked to a FM signal, a voltage controlled oscillator (VCO) tracks the instantaneous frequency of the input signal. A filtered error voltage that controls the VCO and maintains the lock with the input FM signal is demodulated. The VCO transfer characteristics determine the linearity of the demodulated output.

In a different embodiment, a quadrature detector may be used in the demodulation section 107 of FIG. 1. The quadrature detector phase shifts a signal by 90-degrees and multiplies the phase-shifted signal by an unshifted version of the signal. As a result, the original information signal is isolated, which is later selected and amplified.

As seen in FIG. 1, the A/D filter 109 is used to convert an analog signal received at the set of receiving into a digital signal. The type of the A/D filter 109 of FIG. 1 may vary from one embodiment to another. In one embodiment the A/D filter 109 shown in FIG. 1 may be a direct-conversion A/D filter. Direct conversion A/D filters generally have a bank of comparators sampling an input signal in parallel, with each comparator firing at a decoded voltage range. The comparator bank feeds a logic circuit that generates a code for each voltage range.

In a different embodiment, a successive approximation A/D filter may be used. A successive approximation A/D filter uses a comparator to successively narrow a range that contains the input voltage. At each successive step, the converter compares the input voltage to the output of an internal digital to analog converter which may represent a midpoint of a selected voltage range. At each step in this process, the approximation is stored in a successive approximation register (SAR).

In a different embodiment, a ramp-compare A/D filter may be used. A ramp-compare A/D filter produces a sawtooth signal that ramps up or down and returns to zero. When the ramp starts, a timer starts counting. When the ramp voltage matches the input, a comparator fires, and the value on the timer is recorded. Timed ramp converters require a low number of transistors. The ramp time is sensitive to temperature because the circuit generating the ramp is often a simple oscillator.

In a different embodiment, a Wilkinson A/D filter may be used. The Wilkinson A/D filter is based on the comparison of an input voltage and a voltage produced across a charging capacitor. The capacitor is allowed to charge until a respective voltage is equal to the amplitude of the input pulse, wherein a comparator is used to determine if the required conditions are satisfied. Next, the capacitor is allowed to discharge linearly, which produces a ramp voltage. At the point when the capacitor begins to discharge, a gate pulse is initiated. The gate pulse remains on until the capacitor is completely discharged. Thus, the duration of the gate pulse is directly proportional to the amplitude of the input pulse. The gate pulse operates a linear gate which receives pulses from a high-frequency oscillator clock. While the gate is open, a discrete number of clock pulses pass through the linear gate and are recorded by an address register. The time the linear gate is open is proportional to the amplitude of the input pulse. Therefore, the number of clock pulses recorded in the address register are also proportional to the amplitude of the input pulse.

In a different embodiment, an integrating A/D filter may be used. The integrating A/D filter applies an unknown input voltage to the input of an integrator and allows the voltage to ramp for a fixed time period known as a run-up period. Next, a known reference voltage of opposite polarity is applied to the integrator and is allowed to ramp until the integrator output returns to zero known as a run-down period. The input voltage is computed as a function of the reference voltage, the constant run-up time period, and the measured run-down time period. The run-down time measurement is usually made in units of the clock of the converter, such that longer integration times allow for higher resolutions.

In a different embodiment, a delta-encoded A/D filter may be used. A delta-encoded A/D filter includes an up-down counter that feeds a D/A filter. An input signal and the D/A filter both feed a comparator which controls the counter. A circuit associated with the delta-encoded A/D filter uses a negative feedback from the comparator to adjust the counter until an output of the D/A filter converges to a value similar to the input signal.

In a different embodiment, a pipelined A/D filter may be used which utilizes two or more steps of sub-ranging. In a first step, a coarse conversion is performed. In a second step, a difference to the input signal is determined with a D/A filter and the difference is converted. The results from the first step and the second step are combined in a final step.

In a different embodiment, a sigma-delta A/D filter may be used. A sigma-delta A/D filter oversamples a desired signal by a large factor and filters the desired signal band. Generally, a smaller number of bits than required are converted using a direct conversion A/D filter after the sigma-delta A/D filter. The resulting signal, along with the error generated by the discrete levels of the direct conversion A/D filter, is fed back and subtracted from the input to the sigma-delta A/D filter. The negative feedback has the effect of noise shaping the error due to the direct conversion A/D filter so that it does not appear in the desired signal frequencies. A digital filter, preferably a decimation filter, follows the sigma-delta A/D filter which reduces the sampling rate, filters off unwanted noise signal and increases the resolution of the output.

In a different embodiment, a time-interleaved A/D filter may be used. A time-interleaved A/D filter uses m parallel A/D filters where each A/D filter samples data every $m^{th}$ cycle of an effective sample clock. As a result, a sample rate is increased m-times than the capability of an individual A/D filter.

In a different embodiment, an A/D filter with an intermediate FM stage may be used.

A/D filters with an intermediate FM stage uses a voltage-to-frequency converter to convert the desired signal into an oscillating signal with a frequency proportional to the voltage of the desired signal and uses a frequency counter to convert the frequency into a digital count proportional to the desired signal voltage. Longer integration times allow for higher resolutions. Likewise, the speed of the converter may be improved by sacrificing resolution. The two parts of the A/D filter may be widely separated, with the frequency signal passing through an opto-isolator or transmitted wirelessly.

In reference to FIG. 1, at the receiver filter 111, H(z), the received signal, r(n), is used to extract a plurality of target related information of the unknown target, wherein the plurality of target related information comprises a target impulse response and a clutter impulse response. In contrast to a matched filter, which utilizes a channel impulse response, the receiver filter 111 of FIG. 1 is designed without knowing the channel impulse response. In a preferred embodiment, the receiver filter 111 of FIG. 1 is designed using outage probability, wherein the outage probability is a statistics based performance measurement and is obtained using heuristic enhancement techniques.

To extract the target related information, the receiver filter 111 shown in FIG. 1, is communicably coupled with a processing unit. Preferably, the processing unit includes circuitry with program instructions to derive an expression for the plurality of reflected waveforms as a function of the target impulse response, the clutter impulse response, and a sequence of white noise, wherein the sequence of white noise is from the set of receiving antenna elements.

The existence of an unknown target is given by the expression in equation 1. Equations related to unknown target existence have previously been disclosed. See C. Y. Chen, P. Vaidyanathan, MIMO radar waveform optimization with prior information of the extended target and clutter, IEEE Transactions on Signal Processing 57 (9) (2009) 3533-3544, incorporated herein by reference in its entirety.

$$T(z) = \sum_{n=0}^{L} T(n)z^{-n} \tag{1}$$

Where:

$T(n) \in \mathbb{C}^{N_R \times N_T}$ is the target impulse response, which is a complex circular Gaussian random variable with zero mean and covariance $R_T$, i.e., $T(n) \sim \mathcal{CN}(0, R_T)$;

L represents the total number of multi-paths for the target channel.

$N_T$—Number of antenna elements in the set of transmitting antenna elements.

$N_R$—Number of antenna elements in the set of receiving antenna elements.

$\mathbb{C}$—Representation of a complex circular Gaussian random variable.

The clutter transfer function is represented in equation 2.

$$C(z) = \sum_{n=-\infty}^{\infty} C(n)z^{-n} \tag{2}$$

Where:

$C(n) \in \mathbb{C}^{N_R \times N_T}$ is the clutter impulse response which is $C(n) \sim \mathcal{CN}(0, R_C)$, and $R_C$ is the covariance matrix.

The processing unit further includes circuitry to formulate a received signal from the expression for the plurality of reflected waveforms, wherein the received signal is a function of the target impulse response, the clutter impulse response, and the sequence of white noise. Thus, a received baseband waveform r(n) can now be expressed as shown in equation 3.

$$r(n) \sum_{m=0}^{L_T} (T(n-m) + C(n-m))f(m) + v(n), \tag{3}$$

Where:

v(n) represents the sequence of white noise in the receiver;

$L_T$ is the order of the finite duration signal f(n).

The received baseband waveform r(n) can now be expressed as shown in equation 4.

$$r \triangleq [r(0)^T r(1)^T \ldots r(L_R)^T]^T \in \mathbb{C}^{N_R(L_R+1) \times 1}, \tag{4}$$

Where:

$L_R$ is the order of the receiving filter H(z).

The overall received signal may be formulated as shown in equation 5.

$$r = (T+C)f+v, \tag{5}$$

Where:

f and v are the accumulated vectors containing all the terms of f(n) and v(n) resulting in equation 6 and 7 respectively $$f \triangleq [f(0)^T f(1)^T \ldots f(L_T)^T]^T \in \mathbb{C}^{N_T(L_T+1) \times 1} \tag{6}$$

$$v \triangleq [v(0)^T v(1)^T \ldots v(L_T)^T]^T \in \mathbb{C}^{N_R(L_R+1) \times 1} \tag{7}$$

T and C in equation 5, which represent the target impulse response and the clutter impulse response of the received signal, are block Toeplitz matrices which incorporate all multipath vectors t(n) and c(n), respectively, and are defined as the following matrix representation.

$$T \triangleq \begin{bmatrix} t(0) & 0 & \ldots & 0 \\ t(1) & t(0) & \ddots & \vdots \\ \vdots & t(1) & \ddots & 0 \\ t(L) & \vdots & \ddots & t(0) \\ 0 & t(L) & \ddots & t(1) \\ \vdots & \ddots & \ddots & \vdots \\ 0 & \ldots & 0 & t(L) \end{bmatrix}; C \triangleq \begin{bmatrix} c(0) & c(-1) & \ldots & c(-L_T) \\ c(1) & c(0) & \ddots & \vdots \\ \vdots & c(1) & \ddots & \vdots \\ \vdots & \ddots & \ddots & c(0) \\ \vdots & \ddots & \ddots & c(1) \\ \vdots & \ddots & \ddots & \vdots \\ c(L_R) & c(L_R-1) & \ldots & c(L) \end{bmatrix}$$

When the received signal is formulated, the processing unit proceeds to determine an output of the receiver filter 11 shown in FIG. 1 as a function of the clutter response and the sequence of white noise. Further referring to FIG. 1, the output of the receiver filter 111, y, may be expressed as shown in equation 8.

$$y = h^H r = \underbrace{h^H Tf}_{signal} + \underbrace{h^H Cf}_{clutter} + \underbrace{h^H v}_{noise}. \quad (8)$$

Where:

$N_R(L_R+1) \times 1$ vector h consists of the impulse response of the receiving filter H(z).

Using the output of the receiver filter 111 of FIG. 1 which is expressed in equation 8, the processing unit determines a signal-to-interference-plus-noise ratio (SINR), denoted by η. In general, SINR is a method of measuring the quality of a wireless connection. SINR is defined as the power of a certain signal of interest divided by the sum of the interference power from all the other interfering signals and the power of background noise. In a preferred embodiment, the SINR can be defined as a function of vector f and vector h as seen in equation 9.

$$\eta(f, h) \triangleq \frac{|hTf|^2}{|hv|^2 + |hCf|^2}, \quad (9)$$

By using a Kronecker-structured correlation matrix formulation, the transmitting correlation, $R_{tx}$, and the receiving correlation, $R_{rx}$, for the target $R_T$ and the clutter $R_C$ may be represented as shown in equation 10 and equation 11. See A. K. Hassan, M. Moinuddin, U. M. Al-Saggaf, T. Y. Al-Naffouri, Performance analysis of beamforming in MU-MIMO systems for Rayleigh fading channels, IEEE Access 5 (2017) 3709-3720, incorporated herein by reference in its entirety.

$$R_T = R_{Ttx}{}^T \otimes R_{Trx}, \quad (10)$$

$$R_C = R_{Ctx}{}^T \otimes R_{Crx}, \quad (11)$$

By applying the whitening transformation for the target, T, and the clutter, C, equation 12 and equation 13 may be obtained.

$$T = R_{Trx}^{\frac{1}{2}} \overline{T} R_{Ttx}^{\frac{1}{2}}, \quad (12)$$

$$C = R_{Crx}^{\frac{1}{2}} \overline{C} R_{Ctx}^{\frac{1}{2}}, \quad (13)$$

Where:

The elements of $\overline{T}$ and $\overline{C}$ are independent and identically distributed (i.i.d.) complex Gaussian random variables with zero mean and unit variance.

Therefore, SINR may be represented as shown in equation 14.

$$\eta(f, h) \triangleq \frac{\left|h R_{Trx}^{\frac{1}{2}} \overline{T} R_{Ttx}^{\frac{1}{2}} f\right|^2}{(hv)(hv)^T + \left|h R_{Crx}^{\frac{1}{2}} \overline{C} R_{Ctx}^{\frac{1}{2}} f\right|^2}, \quad (14)$$

$\overline{T}$ and $\overline{C}$ are vectorized as $\bar{t} = \text{vec}(\overline{T})$ and $\bar{c} = \text{vec}(\overline{C})$, respectively, with dimensions $N_R(L_R+1)N_T(L_T+1) \times 1$. The composite channel and waveform terms of target and clutter parts of the above expression may be expressed as $$T R_{Ttx}^{\frac{1}{2}} f = \left( I \otimes \left( R_{Ttx}^{\frac{1}{2}} f \right)^T \right) \bar{t} \text{ and } C R_{Ctx}^{\frac{1}{2}} = \left( I \otimes \left( R_{Ctx}^{\frac{1}{2}} \right)^T \right) \bar{t}$$

respectively.

The present disclosure describes using an indefinite quadratic forms approach (IQF) to obtain a cumulative density function (CDF) and a probability density function (PDF). The IQF approach has previously been utilized with Gaussian random variables. See T. Y. Al-Naffouri, M. Moinuddin, N. Ajeeb, B. Hassibi, A. L. Moustakas, On the distribution of indefinite quadratic forms in Gaussian random variables, IEEE Transactions on Communications 64 (1) (2016) 153-165; and T. Y. Al-Naffouri, B. Hassibi, On the distribution of indefinite quadratic forms in Gaussian random variables, in: Information Theory, 2009. ISIT 2009. IEEE International Symposium on, IEEE, 2009, pp. 1744-1748, each incorporated herein by reference in their entirety. The IQF approach enables the present disclosure to achieve a closed-form expression for the CDF and a corresponding PDF. Using the closed-form CDF, also referred to as the outage probability, the present disclosure derives at least one calculation module that may be used to minimize outage probability. Thus, SINR may be expressed in a quadratic form as shown in equation 15.

$$\eta(f, h) \triangleq \frac{\|\bar{t}\|_A^2}{\sigma^2 \|h\|^2 + \|\bar{c}\|_B^2} \quad (15)$$

From equation 15, the Hermitian matrices for the target and clutter terms A and B can be represented by equation 16 and equation 17 respectively.

$$A = \left( I \otimes \left( R_{Ttx}^{\frac{1}{2}} f \right)^T \right)^H R_{Trx}^{\frac{H}{2}} h^H h R_{Trx}^{\frac{1}{2}} \left( I \otimes \left( R_{Ttx}^{\frac{1}{2}} f \right)^T \right), \quad (16)$$

$$B = \left( I \otimes \left( R_{Ctx}^{\frac{1}{2}} f \right)^T \right)^H R_{Crx}^{\frac{H}{2}} h^H h R_{Crx}^{\frac{1}{2}} \left( I \otimes \left( R_{Ctx}^{\frac{1}{2}} f \right)^T \right). \quad (17)$$

Outage probability is an indication of the quality of a communication channel, wherein the outage probability is measured by finding a probability that a specific transmission rate is not supported. More specifically, the outage probability is defined as the probability that an information rate is less than a required threshold information rate. In order to characterize an outage probability for the collocated MIMO radar, a condition is imposed on the CDF of the SINR expressed in equation 15 where, $P_{out}(\gamma|\Psi) = \Pr(\eta(f, h) < \gamma)$, and $\Psi = \|\bar{c}\|_B^2$ defines the condition and γ is a predetermined threshold value.

In particular, the processing unit characterizes the outage probability for the MIMO radar by determining a closed-form expression of the CDF of the quadratic form of the SINR. Thus, the outage probability, which is the closed-form expression of the CDF, may be represented as shown in equation 18.

$$P_{out}(\gamma | \Psi) = \Pr\left( \frac{\|\bar{t}\|_A^2}{\sigma^2 \|h\|^2 + \Psi} < \gamma \right) \quad (18)$$

-continued
$$= Pr((\sigma^2\|h\|^2 + \Psi)\gamma - \|\bar{t}\|_A^2 < 0),$$
$$= \int_{-\infty}^{\infty} f(\bar{t})u((\sigma^2\|h\|^2 + \Psi)\gamma - \|\bar{t}\|_A^2)d\bar{t},$$

Where:
f($\bar{t}$)—the probability density function (PDF) of channel vector of length:

$L=N_R(L_R+1)N_T(L_T+1);$ u(x)—Fourier representation of the unit step function.

$$f(\bar{t}) = \frac{1}{\pi^L}e^{-\|\bar{t}\|^2}, \quad (19)$$

$$u(x) = \frac{1}{2\pi}\int_{-\infty}^{\infty}\frac{e^{x(j\omega+\beta)}}{(j\omega+\beta)}dw.$$

Therefore, the CDF in equation 18 can be derived to be represented as shown in equation 20.

$$Pout(\gamma|\Psi) = \frac{1}{2\pi}\int_{-\infty}^{\infty}\frac{e^{(\sigma^2\|h\|^2+\Psi)\gamma(j\omega+\beta)}}{(j\omega+\beta)} \times \quad (20)$$
$$\frac{1}{\pi^L}\int_{-\infty}^{\infty}e^{-\|\bar{t}\|_{I+A(j\omega+\beta)}^2}d\bar{t}dw$$
$$= \frac{1}{2\pi}\int_{-\infty}^{\infty}\frac{e^{(\sigma^2\|h\|^2+\Psi)\gamma(j\omega+\beta)}}{(j\omega+\beta)|I+A_A(j\omega+\beta)|}dw.$$

To remove the condition applied when deriving equation 18, wherein the condition is $\Psi=\|\bar{c}\|_B^2$, the PDF of f($\Psi$) may be represented as shown in equation 21.

$$f(\Psi) = \sum_{r=1}^{L}\frac{\lambda_{Br}^{L-1}}{\prod_{i=1,i\neq l}^{L}(\lambda_{Br}-\lambda_{Bi})}\frac{1}{|\lambda_{Br}|}e^{-\frac{\Phi}{\lambda_{Br}}}u\left(\frac{\Psi}{\lambda_{Br}}\right), \quad (21)$$

Where:
$\lambda_{Br}$—the eigenvalue of the target weight matrix.
The outage probability, CDF, may be simplified as shown in equation 22.

$$Pout(\gamma) = \int_{-\infty}^{\infty}F_{SINR}(\gamma|\Psi)f(\Psi)d\Psi \quad (22)$$
$$= \frac{1}{2\pi}\int_{-\infty}^{\infty}\frac{e^{\sigma^2\|h\|^2\gamma(j\omega+\beta)}}{(j\omega+\beta)|I+\Lambda_A(j\omega+\beta)|} \times$$
$$\sum_{r=1}^{L}\frac{\lambda_{Br}^{L-1}}{\prod_{i=1,i\neq l}^{L}(\lambda_{Br}-\lambda_{Bi})}\frac{1}{|\lambda_{Br}|} \times$$
$$\int_{-\infty}^{\infty}e^{-\frac{\Phi}{\lambda_{Br}}+\Psi\gamma(j\omega+\beta)}u\left(\frac{\Psi}{\lambda_{Br}}\right)d\Psi d\omega$$

In the process of obtaining the closed-form expression for the CDF of the collocated MIMO radar for the unknown target, the CDF of SINR is selected and the second integration shown in equation 22 is denoted as I as seen in equation 31.

$$Pout(\gamma) = \int_{-\infty}^{\infty}Pout(\gamma|\Psi)f(\Psi)d\Psi \quad (31)$$
$$= \frac{1}{2\pi}\int_{-\infty}^{\infty}\frac{e^{\sigma^2\|h\|^2\gamma(j\omega+\beta)}}{(j\omega+\beta)|I+\Lambda_A(j\omega+\beta)|} \times$$
$$\sum_{r=1}^{L}\frac{\lambda_{Br}^{L-1}}{\prod_{i=1,i\neq l}^{L}(\lambda_{Br}-\lambda_{Bi})}\frac{1}{|\lambda_{Br}|} \times$$
$$\underbrace{\int_{-\infty}^{\infty}e^{-\frac{\Phi}{\lambda_{Br}}+\Psi\gamma(j\omega+\beta)}u\left(\frac{\Psi}{\lambda_{Br}}\right)d\Psi}_{I}d\omega$$

In order to solve the section denoted by I of equation 31 with respect to $\Psi$, I is synthesized into two sections $I_1$ and $I_2$. When solving for $I_1$, $\lambda_{Br}$ is assumed to be $\lambda_B$, $>0$. The interval of integration is determined through the unit step function $$u\left(\frac{\Psi}{\lambda_{Br}}\right)$$

where $\Psi>0$ and $I_1$ is represented as shown in equation 32.

$$I_1 = \int_0^{\infty}e^{\frac{-\Phi}{\lambda_{Br}}+\Psi\gamma(j\omega+\beta)}d\Psi \quad (32)$$
$$= \int_0^{\infty}e^{-\Psi\left(\frac{1}{\lambda_{Br}}-\gamma(j\omega+\beta)\right)}d\Psi,$$
$$= \frac{1}{\frac{1}{\lambda_{Br}}-\gamma(j\omega+\beta)},$$

When solving for $I_2$, $\lambda_{Br}$ is considered to be $\lambda_{Br}<0$ when $\Psi<0$ and $I_2$ can be represented as shown in equation 33.

$$I_2 = \int_{-\infty}^{0}e^{\frac{-\Psi}{\lambda_{Br}}+\Psi\gamma(j\omega+\beta)}d\Psi = -\frac{1}{\frac{1}{\lambda_{Br}}-\gamma(j\omega+\beta)}, \quad (33)$$

When comparing equation 32 and equation 33, the difference is that equation 33 provides a negative expression of equation 32. When the integration is solved with respect tow and consider $\lambda_{Br}>0$ equation 34 and equation 35 are obtained.

$$Pout(\gamma) = \frac{1}{2\pi}\times\sum_{r=1}^{L}\frac{\lambda_{Br}^{L-1}}{\prod_{i=1,i\neq l}^{L}(\lambda_{Br}-\lambda_{Bi})}\frac{1}{|\lambda_{Br}|}\times \quad (34)$$

$$\int_{-\infty}^{\infty}\frac{e^{\sigma^2\|h\|^2\gamma(j\omega+\beta)}}{(j\omega+\beta)\left(\frac{1}{\lambda_{Br}}-\gamma(j\omega+\beta)\right)}d\omega, \quad (35)$$
$$\prod_{i=1}^{M}(1+\lambda_{Ai}(j\omega+\beta))$$

By applying the partial-fraction decomposition technique, equation 36 is obtained.

$$Pout(\gamma) = \qquad (36)$$

$$\frac{1}{2\pi} \times \sum_{r=1}^{L} \frac{\lambda_{Br}^{L-1}}{\prod_{i=1,i\neq l}^{L}(\lambda_{Br}-\lambda_{Bi})} \frac{1}{|\lambda_{Br}|} \times \int_{-\infty}^{\infty} \frac{Xe^{\sigma^2}\|h\|^2\gamma(j\omega+\beta)}{(j\omega+\beta)} -$$

$$\frac{Ye^{\sigma^2}\|h\|^2\gamma(j\omega+\beta)}{\gamma\left(\beta-\frac{1}{\gamma\lambda_{Br}}+j\omega\right)} + \sum_{i=1}^{M} \frac{1}{\lambda_{Ai}} \frac{Ze^{\sigma^2}\|h\|^2\gamma(j\omega+\beta)}{\left(\beta+\frac{1}{\lambda_{Ai}}+j\omega\right)} d\omega,$$

The coefficients of partial fractions, X, Y, and Z, can be expressed as shown in equations 37-39.

$$X = \lambda_{Br}, \qquad (37)$$

$$Y = \frac{\gamma\lambda_{Br}}{\prod_{i=1}^{M}\left(1+\frac{\lambda_{Ai}}{\gamma\lambda_{Br}}\right)}, \qquad (38)$$

$$Z = \frac{-\lambda_{Ai}}{\left(\frac{1}{\lambda_{Br}}+\frac{\gamma}{\lambda_{Ai}}\right)\prod_{m=1,m\neq i}^{M}\left(1-\frac{\lambda_{Am}}{\lambda_{Ai}}\right)}, \qquad (39)$$

By applying the residue theory approach on equation 36, and by noticing that the second term inside the intergeneration exists only if $\lambda_{Br} < 0$, the expression in equation 23 may be obtained. See T. Y. Al-Naffouri, M. Moinuddin, N. Ajeeb, B. Hassibi, A. L. Moustakas, On the distribution of indefinite quadratic forms in Gaussian random variables, IEEE Transactions on Communications 64 (1) (2016) 153-165; and I. S. Gradshteyn, I. M. Ryzhik, Table of integrals, series, and products, Academic press, 2014, each incorporated herein by reference in their entirety.

From equation 22, a closed-form expression for the CDF of the collocated MIMO radar for an unknown target may be represented as shown in equation 23.

$$Pout(\gamma) = (2u(\lambda_{Br})-1)\left[\sum_{r=1}^{L}\frac{\lambda_{Br}^{L}}{\prod_{i=1,i\neq l}^{L}(\lambda_{Br}-\lambda_{Bi})}\frac{1}{|\lambda_{Br}|}\times u(\sigma^2\|h\|^2\gamma) - \right. \qquad (23)$$

$$\sum_{r=1}^{L}\frac{\lambda_{Br}^{L+1}}{\prod_{i=1,i\neq l}^{L}(\lambda_{Br}-\lambda_{Bi})}\frac{1}{|\lambda_{Br}|}\times\frac{e^{-\frac{\sigma^2\|h\|^2\gamma}{\lambda_{Br}}}}{\prod_{i=1}^{M}\left(1+\frac{\lambda_{Ai}}{\gamma\lambda_{Br}}\right)}$$

$$u\left(\frac{\sigma^2\|h\|^2\gamma}{\lambda_{Br}}\right)u(-\lambda_{Br}) - \sum_{r=1}^{L}\sum_{i=1}^{M}\frac{\lambda_{Br}^{L-1}}{\prod_{i=1,i\neq l}^{L}(\lambda_{Br}-\lambda_{Bi})}$$

$$\left.\frac{1}{|\lambda_{Br}|}\times\frac{e^{-\frac{\sigma^2\|h\|^2\gamma}{\lambda_{Ai}}}u\left(\frac{\sigma^2\|h\|^2\gamma}{\lambda_{Ai}}\right)u(\lambda_{Ai})}{\left(\frac{1}{\lambda_{Br}}+\frac{\gamma}{\lambda_{Ai}}\right)\prod_{m=1,m\neq i}^{M}\left(1-\frac{\lambda_{Am}}{\lambda_{Ai}}\right)}\right]$$

Where:
$\lambda_{Ai}$—Eigenvalue of clutter weight matrix.
The following expressions may be derived from equation 23.
Where $\lambda_{Br} > 0$ and $\lambda_{At} > 0$:
For a first term and a third term of equation 23, $u(\bullet)=1$ and the second term is 0.

$$Pout(\gamma) = \qquad (24)$$

$$\sum_{r=1}^{L}\frac{\lambda_{Br}^{L}}{\prod_{i=1,i\neq l}^{L}(\lambda_{Br}-\lambda_{Bi})}\frac{1}{|\lambda_{Br}|} - \sum_{r=1}^{L}\sum_{i=1}^{M}\frac{\lambda_{Br}^{L-1}}{\prod_{i=1,i\neq l}^{L}(\lambda_{Br}-\lambda_{Bi})}\frac{1}{|\lambda_{Br}|}\times$$

$$\frac{e^{-\frac{\sigma^2\|h\|^2\gamma}{\lambda_{Ai}}}}{\left(\frac{1}{\lambda_{Br}}+\frac{\gamma}{\lambda_{Ai}}\right)\prod_{m=1,m\neq i}^{M}\left(1-\frac{\lambda_{Am}}{\lambda_{Ai}}\right)}$$

Where $\lambda_{Br} < 0$ and $\lambda_{At} > 0$:
For a first term and third term of equation 23, $u(\bullet)=1$ and the second term is 0.

$$Pout(\gamma) = \qquad (25)$$

$$-\sum_{r=1}^{L}\frac{\lambda_{Br}^{L}}{\prod_{i=1,i\neq l}^{L}(\lambda_{Br}-\lambda_{Bi})}\frac{1}{|\lambda_{Br}|} + \sum_{r=1}^{L}\sum_{i=1}^{M}\frac{\lambda_{Br}^{L-1}}{\prod_{i=1,i\neq l}^{L}(\lambda_{Br}-\lambda_{Bi})}$$

$$\frac{1}{|\lambda_{Br}|}\times\frac{e^{-\frac{\sigma^2\|h\|^2\gamma}{\lambda_{Ai}}}}{\left(\frac{1}{\lambda_{Br}}+\frac{\gamma}{\lambda_{Ai}}\right)\prod_{m=1,m\neq i}^{M}\left(1-\frac{\lambda_{Am}}{\lambda_{Ai}}\right)}$$

Where $\lambda_{Br} > 0$ and $\lambda_{At} < 0$:
For a first term of equation 23, $u(\bullet)=1$ and the second term and the third term are 0.

$$Pout(\gamma) = \sum_{r=1}^{L}\frac{\lambda_{Br}^{L}}{\prod_{i=1,i\neq l}^{L}(\lambda_{Br}-\lambda_{Bi})}\frac{1}{|\lambda_{Br}|} \qquad (26)$$

Where $\lambda_{Br} < 0$ and $\lambda_{Ai} < 0$:
For a first term of equation 23, $u(\bullet)=1$ and the second and the third term are 0.

$$Pout(\gamma) = -\sum_{r=1}^{L}\frac{\lambda_{Br}^{L}}{\prod_{i=1,i\neq l}^{L}(\lambda_{Br}-\lambda_{Bi})}\frac{1}{|\lambda_{Br}|} \qquad (27)$$

The closed-form expressions for the CDF may be used to perform unsupervised constrained optimization and decrease the outage probability for the collocated MIMO radar of a preferred embodiment. More specifically, the processing unit derives at least one calculation module for outage probability, wherein solving the at least one calculation module may reduce the outage probability of the MIMO radar.

A reduction of the outage probability given by solving the at least one calculation module is compared against a pair of previously disclosed closed-form expressions. A first algorithm from the pair of previously disclosed algorithms includes an incremental two-step optimization approach for transmission waveforms and receiving waveforms for transceiver pairs (f, h). See C. Y. Chen, P. Vaidyanathan, MIMO radar waveform optimization with prior information of the extended target and clutter, IEEE Transactions on Signal Processing 57 (9) (2009) 3533-3544; and R. A. Horn, C. R. Johnson, Matrix analysis, Cambridge university press, 1990, each incorporated herein by reference in their entirety. As a first step, a clutter covariance with the transmit waveform effects is calculated. Next, the enhancement of the receiving waveforms is computed using $h=(R_{c,f}+R_v)^{-1}Tf$. As a second step, the clutter covariance with the receiving waveform effect is calculated. Next, the enhancement of transmission waveforms is computed using $f=(R_{c,h}+h^H R_{v-}I)^{-1}T^H h$ and normalization.

A second algorithm from the pair of previously disclosed algorithms, which is based on match filter bound, improves the transmission filters while the receiving filter is matched with the transmitted waveforms. An upper bound of the SINR for fixed transmission filters is obtained by:

$$h = v R_v^{-1} Tf$$

Where:

v is a scalar constraint for the power.

The improvement of the transmission filters may be represented as in equation 28 which is a Rayleigh quotient. See R. A. Horn, C. R. Johnson, Matrix analysis, Cambridge university press, 1990, incorporated herein by reference in its entirety.

$$\max_f f^\dagger T^\dagger R_v^{-1} Tf \qquad (28)$$

$$\text{subj. to } \|f\|^2 \leq 1.$$

The solution of f is the principal component of the matrix $T'R_v^{-1}T$ and the maximum of the objective function is the largest eigenvalue $T'R_v^{-1}T$ which is denoted as $\lambda_1(T'R_v^{-1}T)$.

As mentioned earlier, the processing unit of the present disclosure derives at least one calculation module for the outage probability which is then solved to reduce the outage probability of the MIMO radar. Preferably, the present disclosure describes a first calculation module and a second calculation module when deriving the at least one calculation module, wherein the first calculation module and the second calculation module are associated with the unsupervised constrained reduction of the outage probability which is an objective function.

The first calculation module described in the present disclosure provides a sub-optimal solution for reducing outage probability, $P_{out}(\gamma)$, obtained in equations 24-27 The first calculation module may be represented as seen in equation 29.

$$\min Pout(f,h,\gamma) \qquad (29)$$

The second calculation module described in the present disclosure extends the first calculation module of equation 29 by additionally constraining the allocated power. The second calculation module is shown in equation 30.

$$\min Pout(f,h,\gamma)$$

$$\text{subj. to } \|f\|^2 \leq 1 \qquad (30)$$

The objective functions presented in equation 29 and equation 30 are non-convex functions. Therefore, non-linear algorithms such as an interior-point method, a sequential quadratic programming (SQP) iterative method, and active-set algorithms may be used in solving equation 29 and equation 30.

Figure 3A:
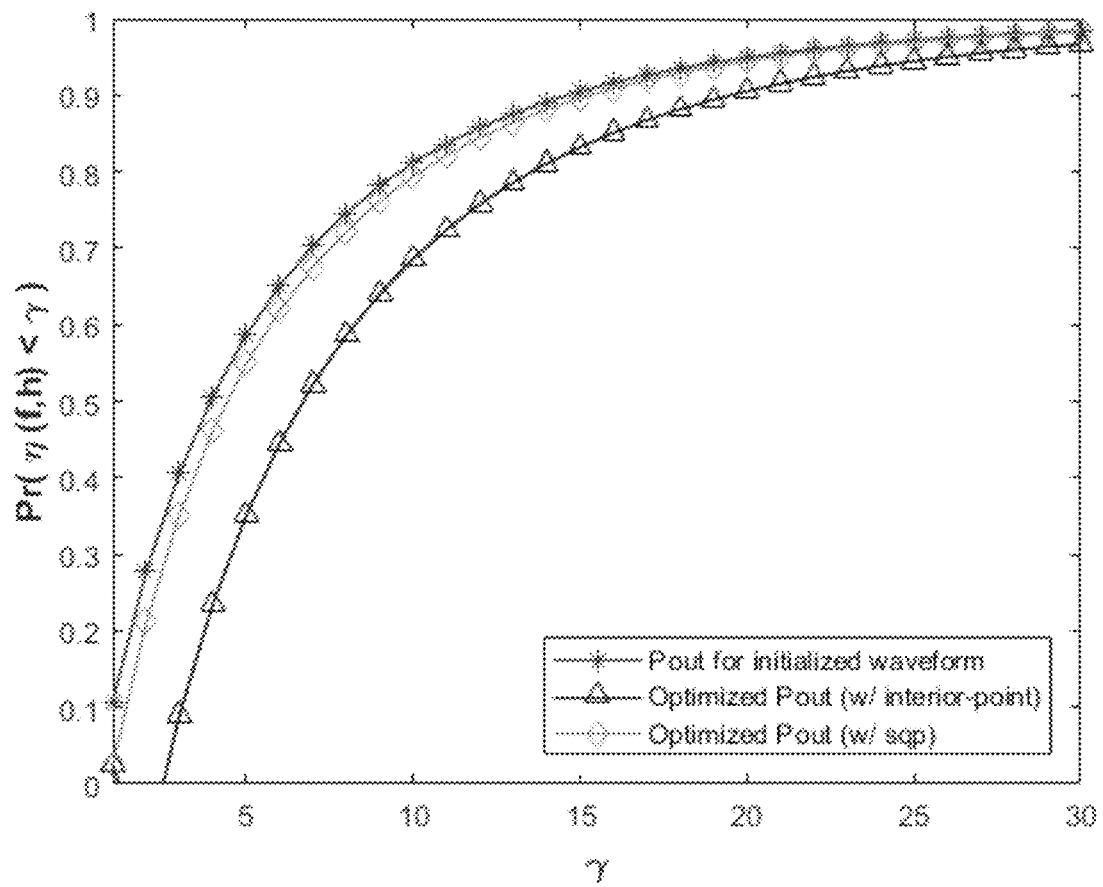
FIG. 3A is a graph illustrating the outage probability against a predetermined threshold value ($\gamma$), wherein a first calculation module of the present disclosure for outage probability is solved using an interior-point method and a sequential quadratic programming (SQP) iterative method.

In a preferred embodiment, the first calculation module and the second calculation module are simulated when 2 antenna elements are used in the set of transmitting antenna elements and the number of receiving antenna elements. FIG. 3A compares the outage probabilities obtained when the first calculation module is solved with the interior-point method, and the SQP iterative method. As seen in FIG. 3A, the outage probability is reduced when the interior-point method is used to solve the first calculation module. Thus, in a preferred embodiment, the interior-point method is used in solving the first calculation module and the second calculation module described as the at least one calculation module derived by the processing unit.

Figure 3B:
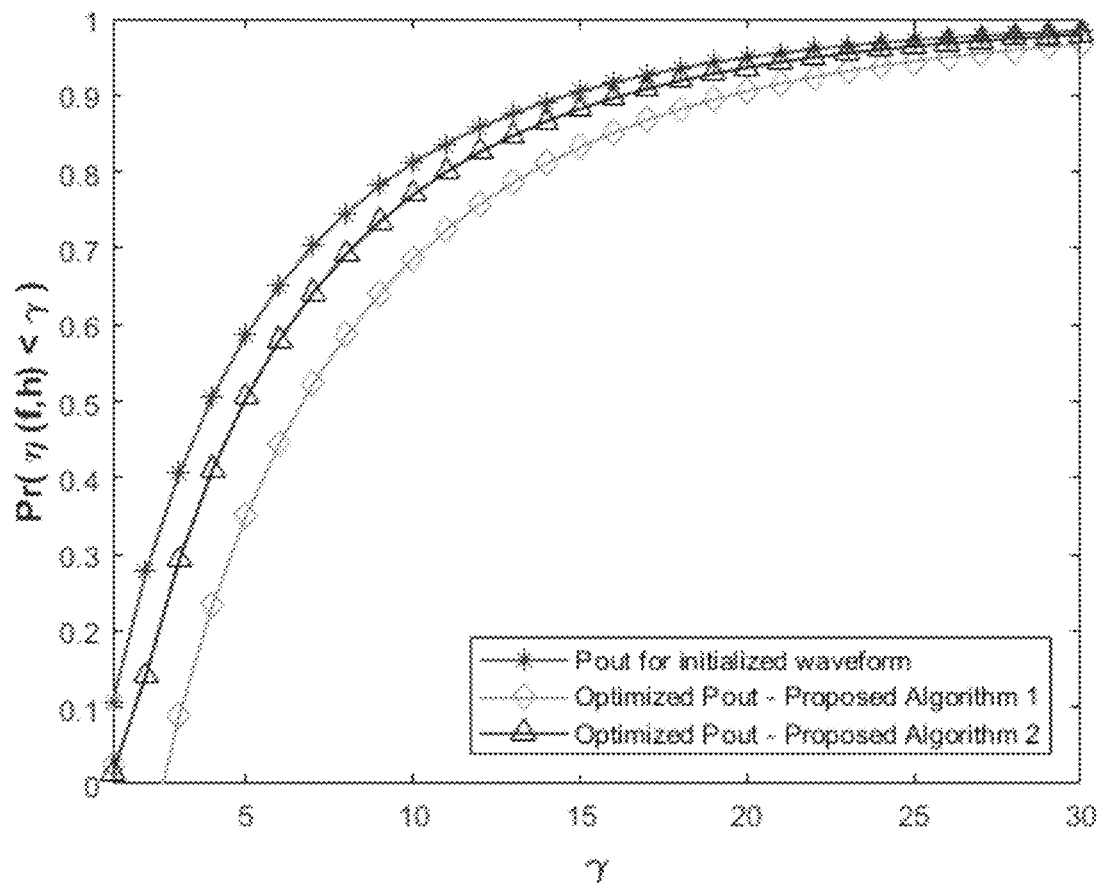
FIG. 3B is a graph illustrating the outage probability against a predetermined threshold value, wherein the outage probability obtained from the first calculation module, represented as algorithm 1, is compared with the outage probability obtained from a second calculation module of the present disclosure, which is represented as algorithm 2, wherein the interior-point method is used to solve the first calculation module and the second calculation module.
Figure 4A:
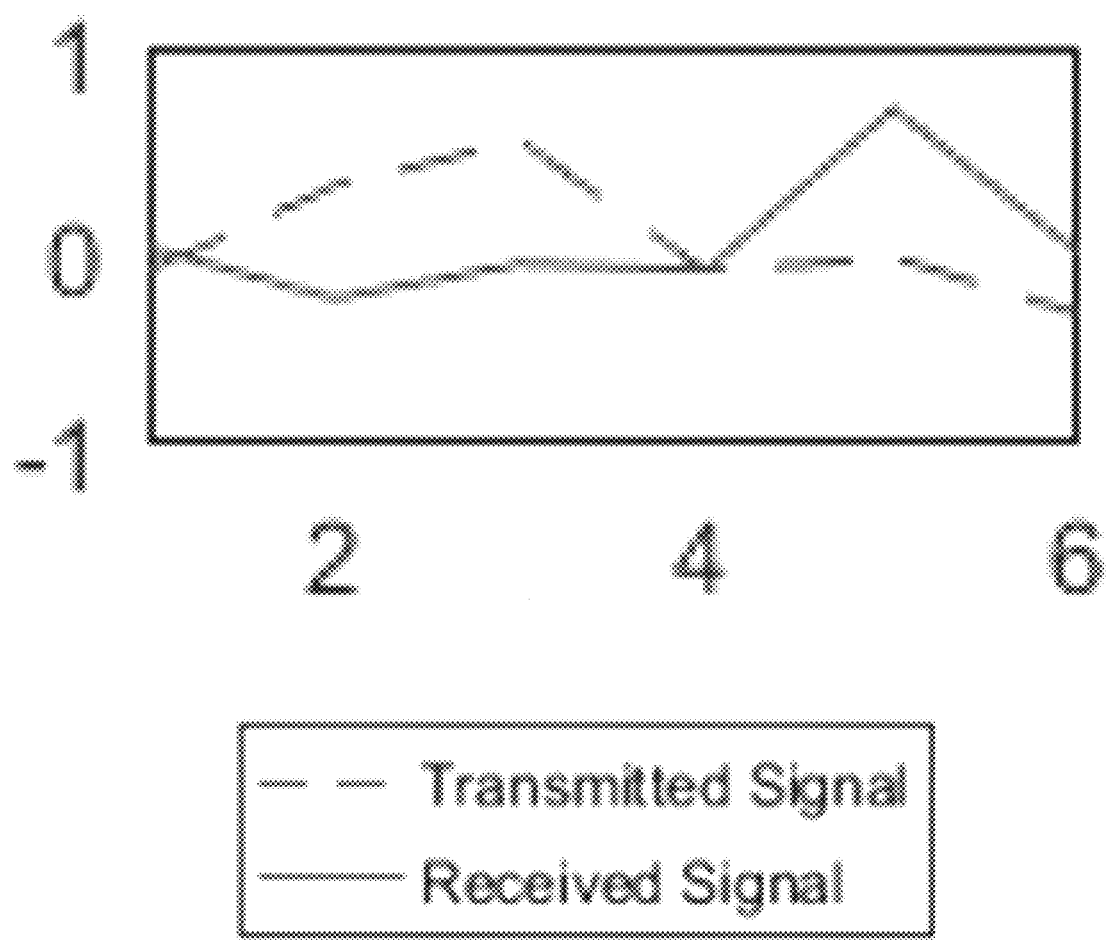
FIG. 4A is a graph illustrating the initial waveforms associated with the MIMO radar, wherein a transmitted signal and a received signal are illustrated for $\gamma=5$.
Figure 4B:
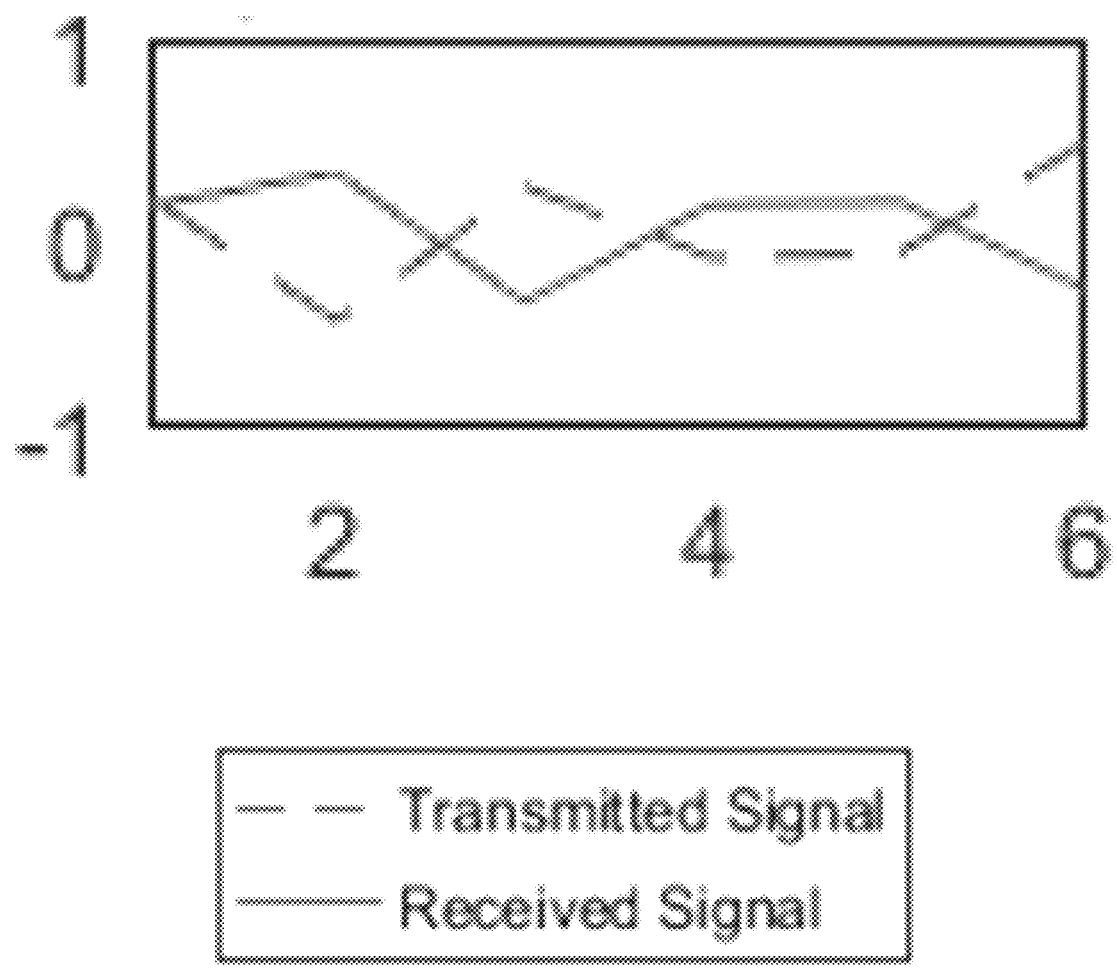
FIG. 4B is a graph illustrating the improved waveforms corresponding to the first calculation module described in the present disclosure, wherein a transmitted signal and a received signal are illustrated for $\gamma=5$.
Figure 4C:
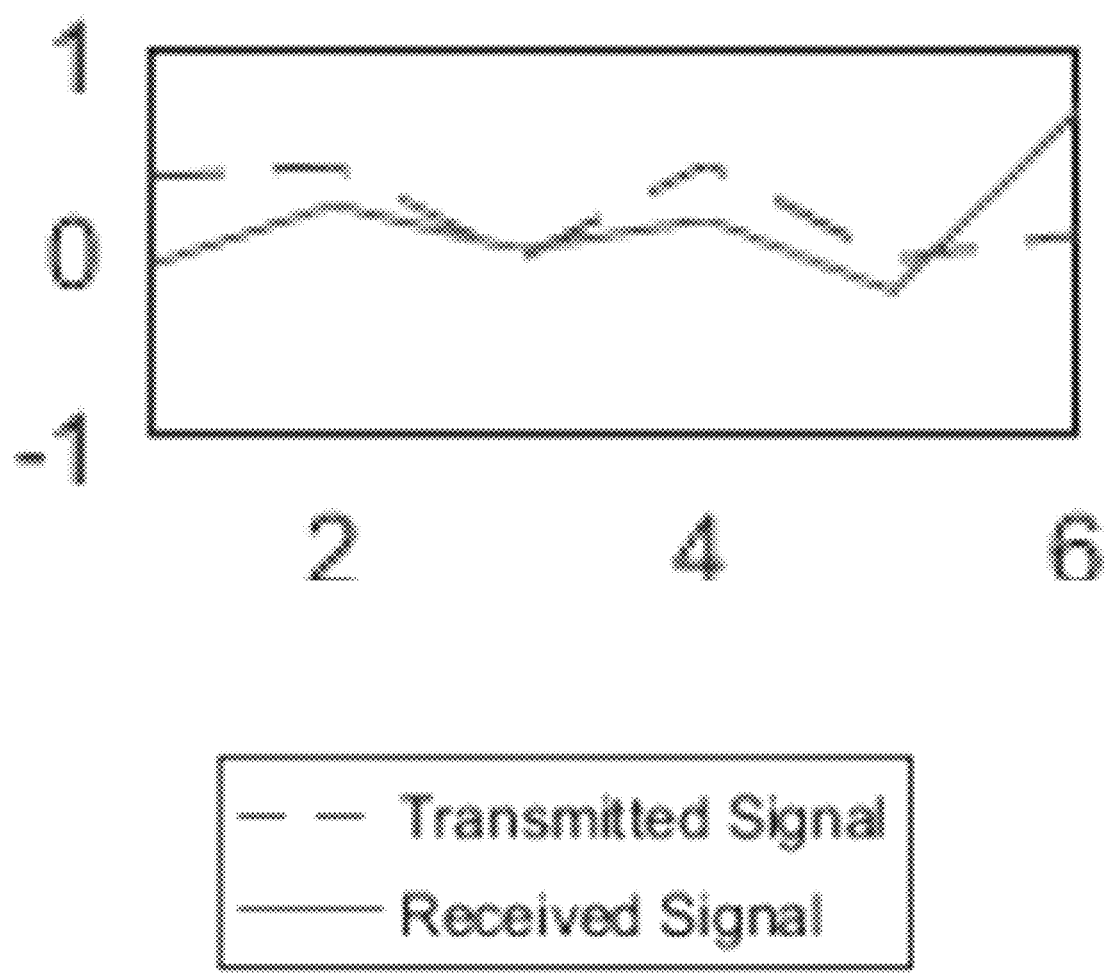
FIG. 4C is a graph illustrating the initial waveforms associated with the MIMO radar, wherein a transmitted signal and a received signal are illustrated for $\gamma=10$.
Figure 4D:
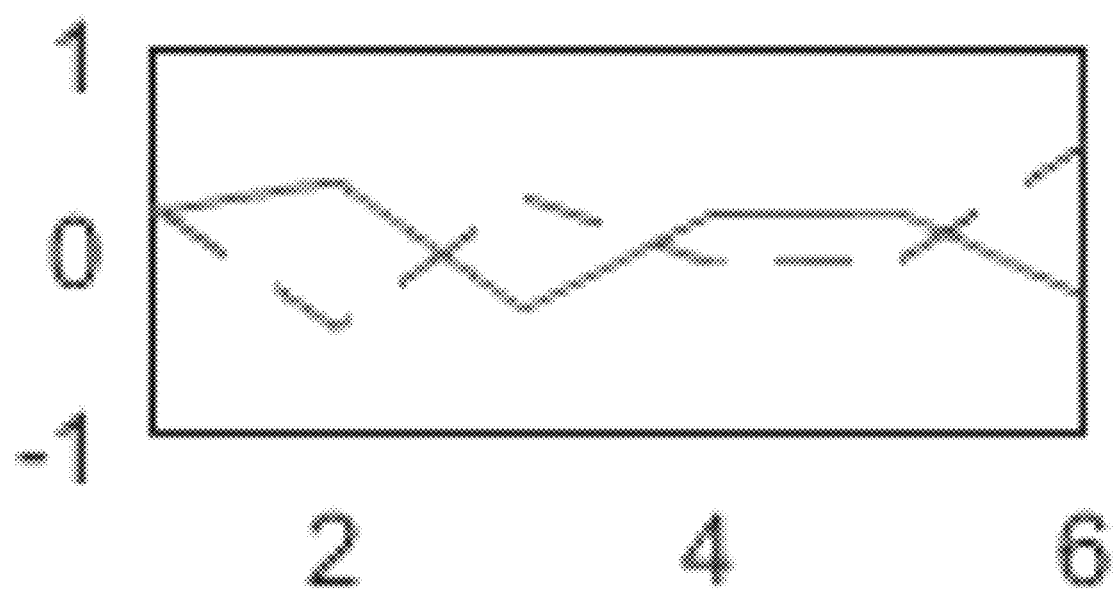
FIG. 4D is a graph illustrating the improved waveforms corresponding to the first calculation module described in the present disclosure, wherein a transmitted signal and a received signal are illustrated for $\gamma=10$.
Figure 4E:
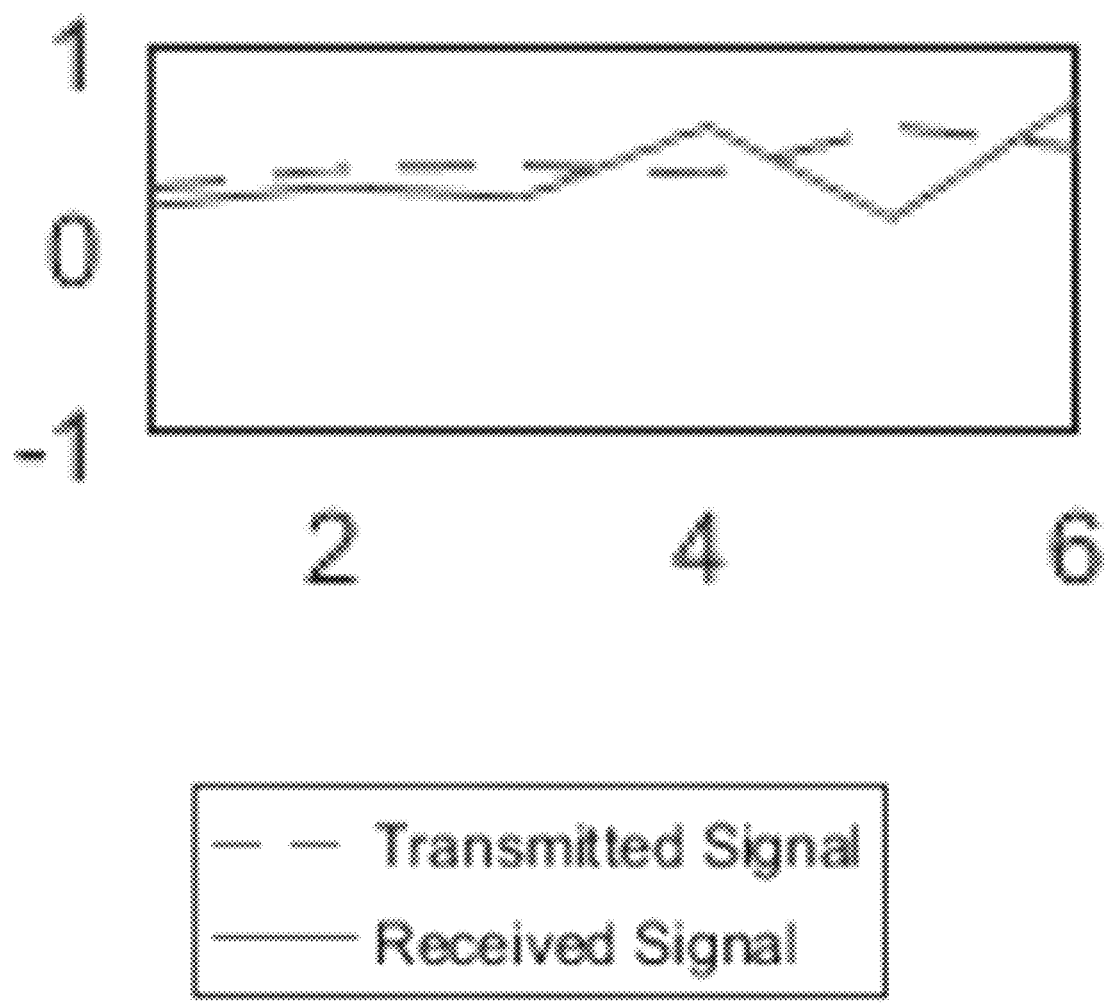
FIG. 4E is a graph illustrating the initial waveforms associated with the MIMO radar, wherein a transmitted signal and a received signal are illustrated for $\gamma=15$.
Figure 4F:
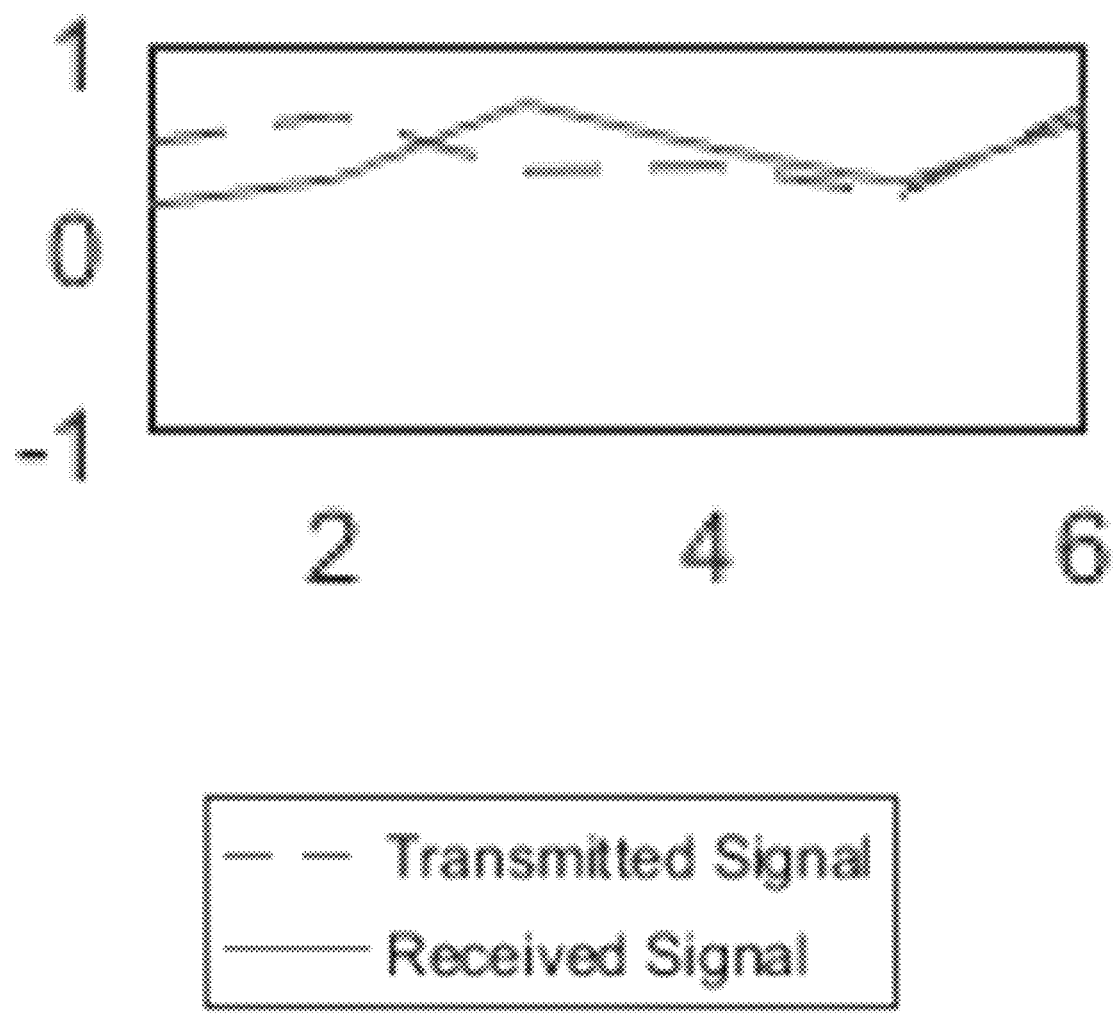
FIG. 4F is a graph illustrating the improved waveforms corresponding to the first calculation module described in the present disclosure, wherein a transmitted signal and a received signal are illustrated for $\gamma=15$.
Figure 4G:
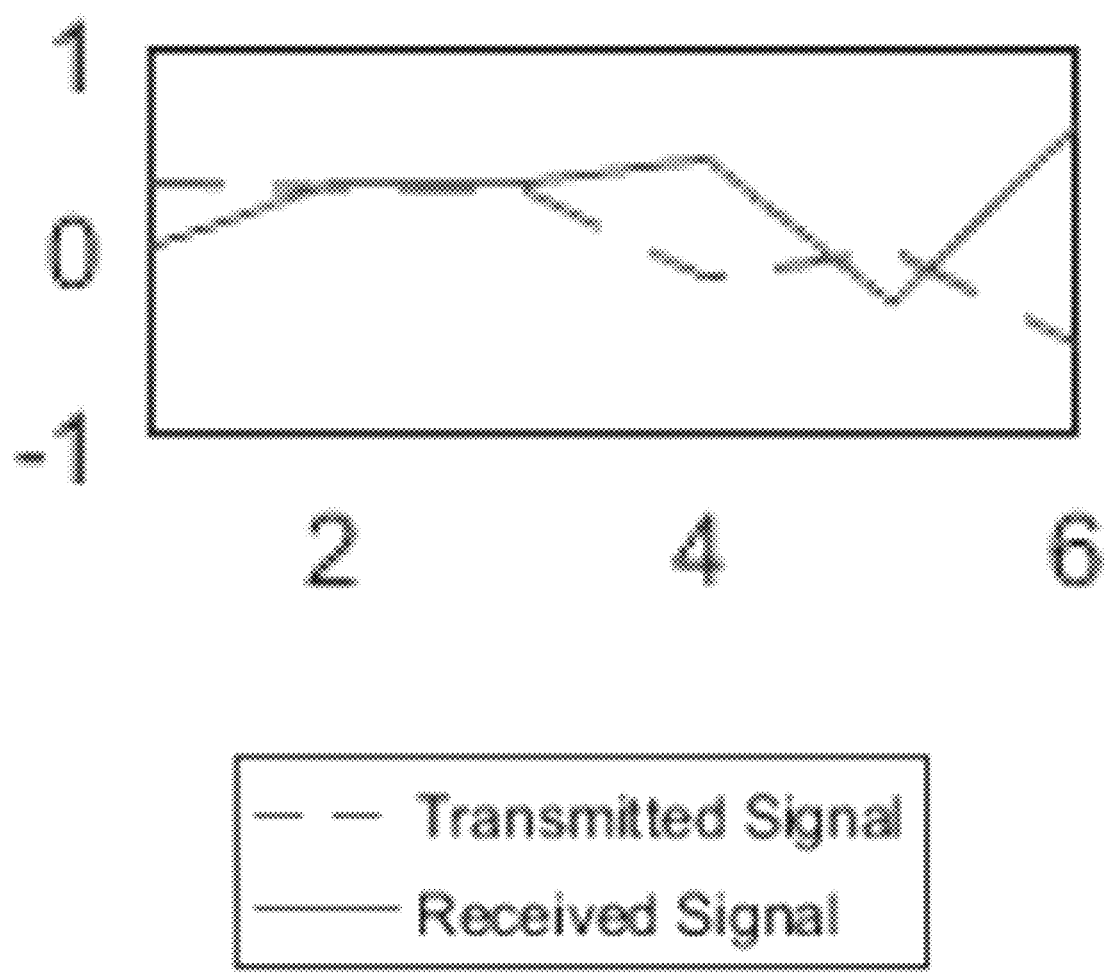
FIG. 4G is a graph illustrating the initial waveforms associated with the MIMO radar, wherein a transmitted signal and a received signal are illustrated for $\gamma=20$.
Figure 4H:
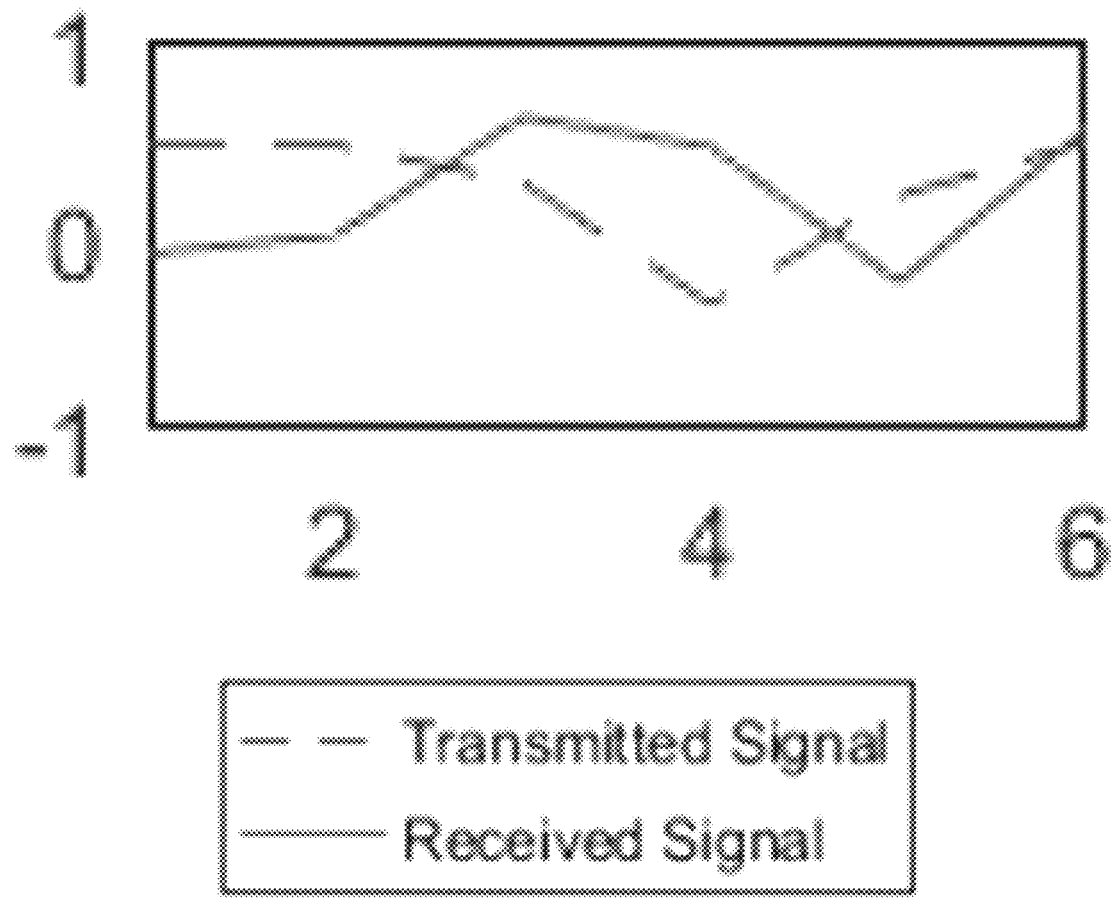
FIG. 4H is a graph illustrating the improved waveforms corresponding to the first calculation module described in the present disclosure, wherein a transmitted signal and a received signal are illustrated for $\gamma=20$.

FIG. 3B compares the outage probabilities when the first calculation module and the second calculation module are solved using the interior-point method. As shown in FIG. 3B, the first calculation module reduces the outage probability more than the second calculation module. More specifically, the performance improvement obtained from the first calculation module is significant at lower values of the SINR threshold.

In the present disclosure, the derived closed-form theoretical results are preferably validated using Monte Carlo simulation means. During simulations, the performance improvement is quantified using the first calculation module and the second calculation module, the first calculation module and the second calculation module are compared with existing algorithms, and the effect of clutter-to-noise ratio (CNR) on the performance of the first calculation module and the second calculation module are investigated.

The transmitting and receiving correlation matrices of the target are denoted by $R_{Tx}$ and $R_{Trx}$, and the transmitting and receiving correlation matrices for the clutter are denoted by $R_{Ctx}$ and $R_{Crx}$ which are based on the correlation coefficient $\eta$ such that $R_{a,b}=\eta^{|a-b|}$ and $0<\eta<1$. Preferably, SNR=2 decibel (dB) and the length of the transmitting and receiving filters is fixed to be 2. For validating theoretical results, approximately $10^5$ Monte Carlo simulations are preferably performed.

Figure 6A:
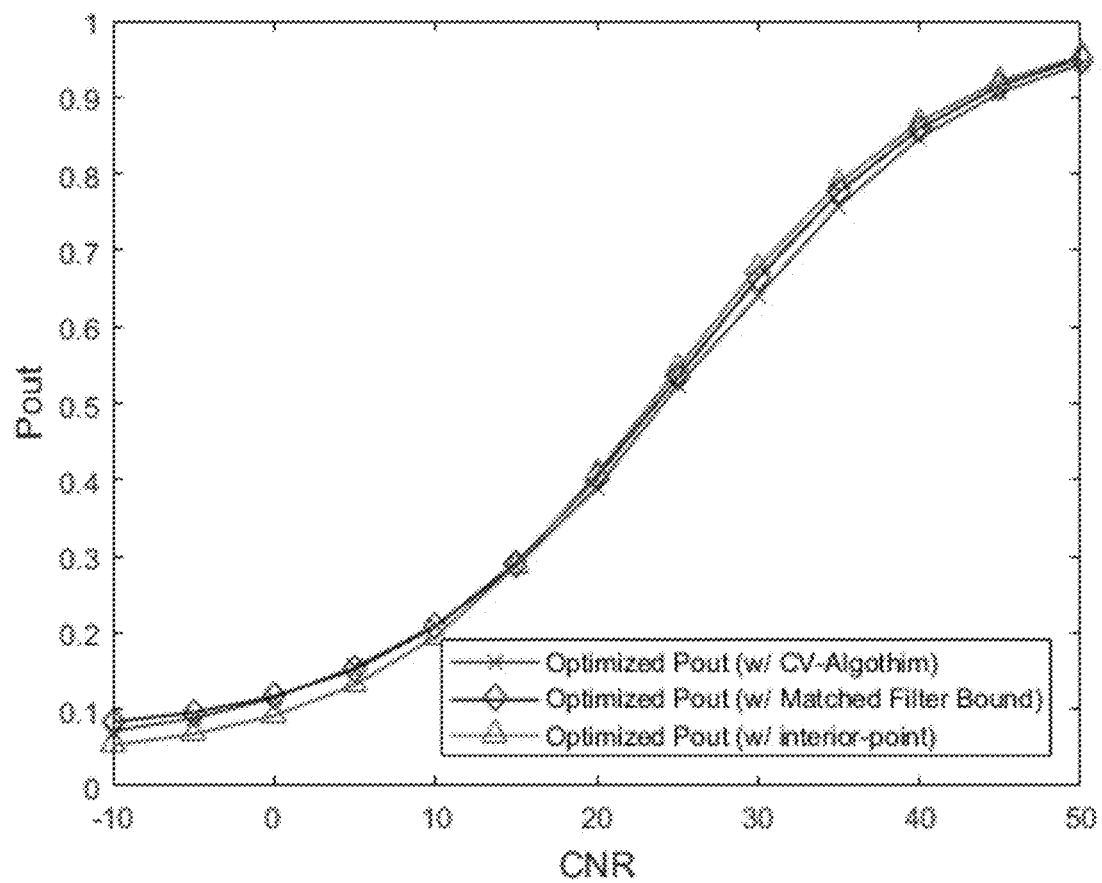
FIG. 6A is a graph comparing outage probability versus clutter-to-noise ratio (CNR), wherein a transmitting correlation matrix of clutter is varied, wherein the outage probability obtained from the first calculation module, represented as CV-Algorithm is compared with the improved outage probability obtained by solving the first calculation module with the interior-point method and the outage probability obtained from a matched filter bound approach in an existing outage probability calculation method.
Figure 6B:
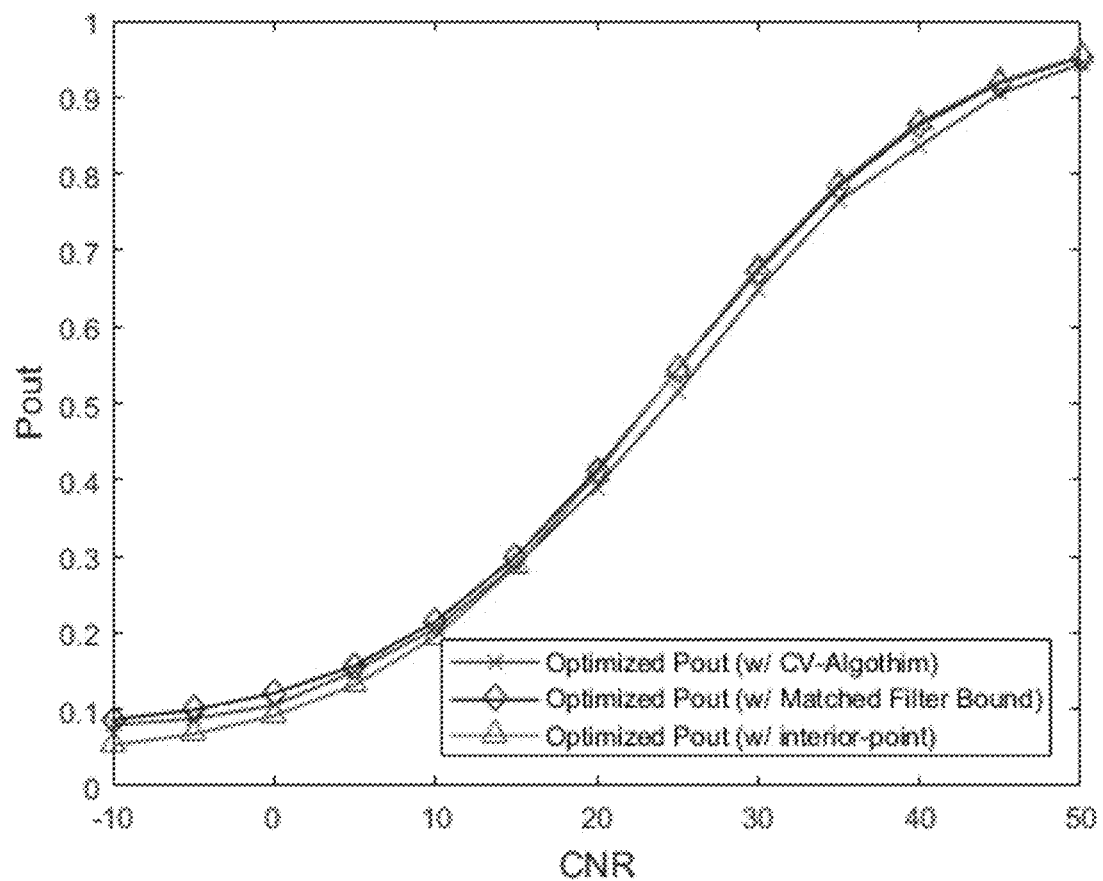
FIG. 6B is a graph comparing outage probability versus CNR, wherein a receiving correlation matrix of clutter is varied, wherein the outage probability obtained from the first calculation module, represented as CV-Algorithm, is compared with the improved outage probability obtained by solving the first calculation module with the interior-point method and the outage probability obtained from a matched filter bound approach in an existing outage probability calculation method.

As seen in FIG. 6A and FIG. 6B, the outage probability increases with an increase in CNR when $R_{Ctx}$ is varied and also when $R_{Crx}$ is varied. Thus, when CNR is low, the first calculation module which is solved using the interior-point method in a preferred embodiment, performs similar to the Match Filter Bound based algorithms.

FIGS. 4A-4H illustrate the transmitted and received signals for initialized waveforms and improved/optimized waveforms. The improved waveforms are obtained by solving the first calculation module using the interior-point method for predetermined threshold values, γ, is 5, 10, 15, and 20. The correlation coefficient, p, which is a measure of the relationship between the transmitted signal and the received signal, improved from 0.23 in the initialized waveforms to 0.45 in the improved waveforms. Preferably, a heuristic enhancement technique based on a fmincon method in MATLAB is utilized to reduce the derived outage probability. Thus, the outage probability is obtained by using enhanced waveforms.

Figure 5:
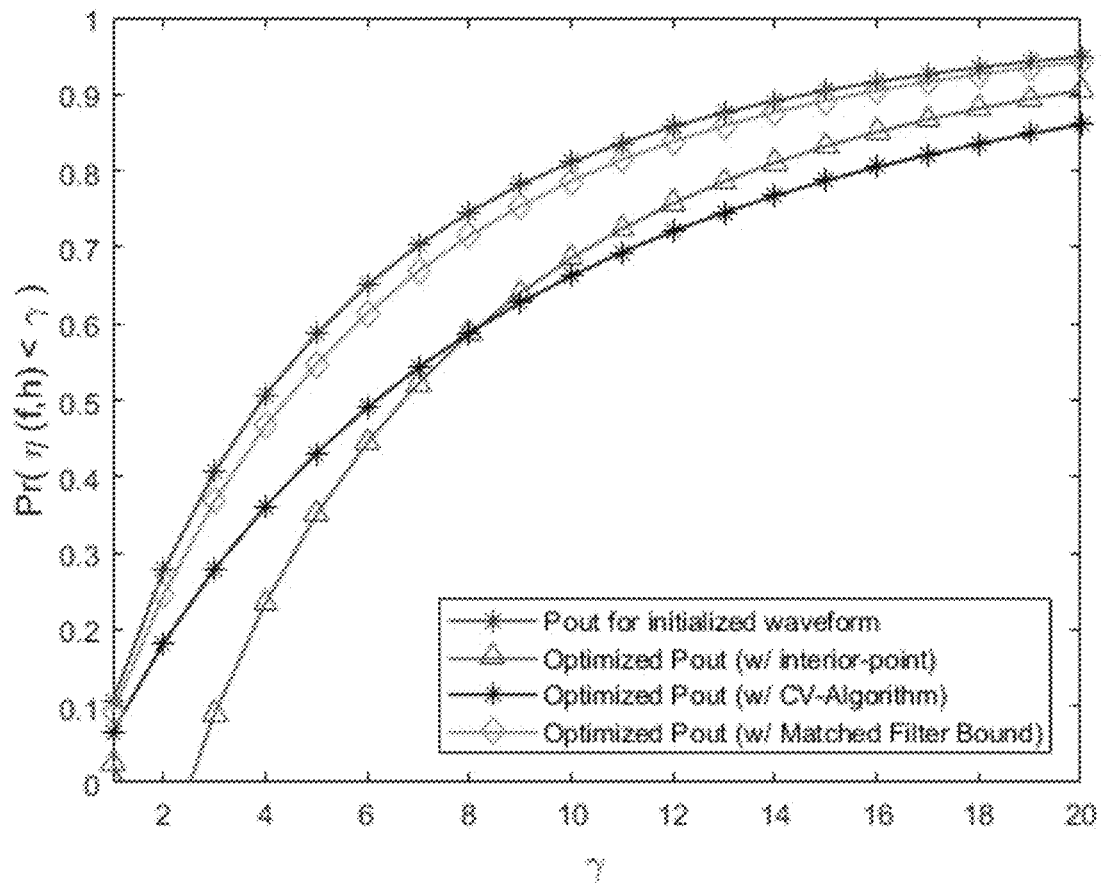
FIG. 5 is a graph illustrating the outage probability against a predetermined threshold value, wherein the outage probability from the first calculation module, represented as algorithm 1, is compared with the outage probability obtained by solving the first calculation module with the interior point method, CV-Algorithm, and Matched Filter Bound.

FIG. 5 compares the results obtained from the first calculation module and the results obtained from the Match Filter Bound. In particular, the first algorithm has greater efficiency for low γ ranges. Match Filter Bound based algorithms have previously been disclosed. See C. Y. Chen, P. Vaidyanathan, MIMO radar waveform optimization with prior information of the extended target and clutter, IEEE Transactions on Signal Processing 57 (9) (2009) 3533-3544, incorporated herein by reference in its entirety.

The present disclosure describes a collocated MIMO radar in the presence of an unknown target and clutter, wherein instantaneous target states are unknown. A closed-form expression for outage probability is derived for generic settings and synthesized based on eigenvalues of clutter and transmitting weight matrix. The transceiver waveforms are improved such that the probability of outage is decreased through the use of indefinite quadratic forms and by considering the characteristics of channel environment such as circular convolution. The present disclosure describes the first calculation module and the second calculation module and the impact of the first and second calculation modules on CNR for varying clutter correlation matrices of transceivers. Moreover, the present disclosure describes the extent of correlation between transmitting and receiving waveforms. In a preferred embodiment, the method of the present disclosure is applied to a collocated MIMO radar. However, in other embodiments, the method of the present disclosure may also be applied to distributed MIMO radars with multiple targets.

Terminology used herein is for the purpose of describing particular embodiments only and is not intended to be limiting of the invention.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of processing waveforms related to an unknown random target at a multiple-input multiple-output (MIMO) radar, comprising:
   initiating a finite signal, at a waveform generator, to be transmitted towards an unknown target from a multiple-input multiple-output (MIMO) radar, wherein the waveform generator is electronically connected to the MIMO radar, wherein the MIMO radar comprises a set of transmitting antenna elements, a set of receiving antenna elements, a digital to analog (D/A) filter, a modulation section, a demodulation section, an analog to digital (A/D) filter, and a receiver filter;
   transmitting a plurality of incident waveforms from the set of transmitting antenna elements, wherein the plurality of incident waveforms is associated with the finite signal transferred to the set of transmitting antenna elements through the D/A filter and the modulation section;
   receiving a plurality of reflected waveforms at the set of receiving antenna elements of the MIMO radar, wherein the plurality of incident waveforms is transformed into the plurality of reflected waveforms by a transfer function of the unknown target and a transfer function of a volume of surrounding clutter,
   transferring the plurality of reflected waveforms through the demodulation section and the A/D filter towards the receiver filter, wherein a plurality of target related information is extracted at the receiver filter, wherein the plurality of target related information comprises a target impulse response and a clutter impulse response, wherein the receiver filter is communicably coupled with a processing unit, wherein the processing unit includes circuitry with program instructions to:
- derive an expression for the plurality of reflected waveforms as a function of the target impulse response, the clutter impulse response, and a sequence of white noise, wherein the sequence of white noise is from the set of receiving antenna elements;
- formulate a received signal from the expression for the plurality of reflected waveforms, wherein the received signal is a function of the target impulse response, the clutter impulse response, and the sequence of white noise;
- determine an output of the receiver filter as a function of the received signal, the clutter impulse response, and the sequence of white noise;
- determine a signal-to-interference-plus-noise ratio (SINR) from the output of the receiver filter and derive a quadratic form of the SINR;
- characterize an outage probability for the MIMO radar by determining a closed-form expression of a cumulative density function (CDF) of the quadratic form of the SINR; and
- derive at least one calculation module for the outage probability, wherein the at least one calculation module is solved to reduce the outage probability of the MIMO radar.

2. The method of processing waveforms related to an unknown random target at a multiple-input multiple-output (MIMO) radar of claim 1, wherein the at least one calculation module is derived such that a value of the outage probability in a subsequent increment is less than a scaled value of the outage probability in a preceding increment.

3. The method of processing waveforms related to an unknown random target at a multiple-input multiple-output (MIMO) radar of claim 1, wherein the at least one calculation module is derived by constraining allocated power.

4. The method of processing waveforms related to an unknown random target at a multiple-input multiple-output (MIMO) radar of claim 1, wherein the at least one calculation module is a non-convex function.

5. The method of processing waveforms related to an unknown random target at a multiple-input multiple-output (MIMO) radar of claim 1, wherein the at least one calculation module is solved using an interior-point method.

6. The method of processing waveforms related to an unknown random target at a multiple-input multiple-output (MIMO) radar of claim 1, wherein the at least one calculation module is solved using a sequential quadratic programming (SQP) iterative method.

7. The method of processing waveforms related to an unknown random target at a multiple-input multiple-output (MIMO) radar of claim 1, wherein the set of transmitting antenna elements comprises $N_T$ antenna elements, wherein a dimension of the plurality of incident waveforms is $N_T \times 1$.

8. The method of processing waveforms related to an unknown random target at a multiple-input multiple-output (MIMO) radar of claim 1, wherein the set of receiving antenna elements comprises $N_R$ antenna elements, wherein a dimension of the plurality of reflected waveforms is $N_R \times 1$.

9. The method of processing waveforms related to an unknown random target at a multiple-input multiple-output (MIMO) radar of claim 1, wherein the MIMO radar is a collocated MIMO radar.

10. The method of processing waveforms related to an unknown random target at a multiple-input multiple-output (MIMO) radar of claim 1, wherein the MIMO radar is a distributed MIMO radar.

11. The method of processing waveforms related to an unknown random target at a multiple-input multiple-output (MIMO) radar of claim 1, wherein an output of the at least one calculation module is validated through Monte Carlo simulation.

12. The method of processing waveforms related to an unknown random target at a multiple-input multiple-output (MIMO) radar of claim 1, wherein the target impulse response and the clutter impulse response of the received signal are Toeplitz block matrices.

13. The method of processing waveforms related to an unknown random target at a multiple-input multiple-output (MIMO) radar of claim 1, wherein the at least one calculation module is a function of a scaling parameter, wherein the scaling parameter ranges from 0 to 1.

* * * * *